(12) United States Patent
Sekiguchi et al.

(10) Patent No.: US 8,449,965 B2
(45) Date of Patent: May 28, 2013

(54) MULTILAYER OPTICAL RECORDING MEDIUM AND OPTICAL RECORDING METHOD

(75) Inventors: Hiroyoshi Sekiguchi, Yokohama (JP); Michiaki Shinotsuka, Hiratsuka (JP); Masaru Shinkai, Yokohama (JP); Eiko Hibino, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 909 days.

(21) Appl. No.: 12/065,660

(22) PCT Filed: Aug. 31, 2006

(86) PCT No.: PCT/JP2006/317707
§ 371 (c)(1),
(2), (4) Date: Mar. 4, 2008

(87) PCT Pub. No.: WO2007/029759
PCT Pub. Date: Mar. 15, 2007

(65) Prior Publication Data
US 2009/0155514 A1      Jun. 18, 2009

(30) Foreign Application Priority Data

Sep. 5, 2005 (JP) .................................. 2005-256410
Mar. 1, 2006 (JP) .................................. 2006-054514
May 10, 2006 (JP) .................................. 2006-131949

(51) Int. Cl.
*B32B 3/02* (2006.01)
*G11B 7/24* (2006.01)

(52) U.S. Cl.
USPC ............... 428/64.4; 428/64.6; 430/270.13; G9B/7.142; G9B/7.189; G9B/7.19

(58) Field of Classification Search
USPC .................. 428/64.4, 64.5, 64.6; 430/270.13; G9B/7.142, 7.189, 7.19
See application file for complete search history.

(56) References Cited

U.S. PATENT DOCUMENTS 6,007,889 A * 12/1999 Nee .............................. 428/64.1
6,280,811 B1 * 8/2001 Nee .............................. 428/64.1

(Continued)

FOREIGN PATENT DOCUMENTS

CN          1462431 A       12/2003
JP          2002-269826     9/2002

(Continued)

OTHER PUBLICATIONS

Machine Translation of detailed description of JP2005-190642 A. Created on Dec. 20, 2010.*

(Continued)

*Primary Examiner* — Gerard Higgins
(74) *Attorney, Agent, or Firm* — Cooper & Dunham LLP

(57) ABSTRACT

A multilayer optical recording medium including at least multiple information layers each having at least a phase change recording layer capable of recording information by laser irradiation and a reflection layer, wherein each information layer other than the innermost information layer as seen from a side of the laser irradiation has at least a lower protection layer, the phase change recording layer, an upper protection layer, the reflection layer and an optical transmission layer, the upper protection layer and the optical transmission layer in each information layer other than the innermost information layer as seen from the side of the laser irradiation are composed of an Sn oxide-containing material and a thickness of the upper protection layer in each information layer other than the innermost information layer as seen from the side of the laser irradiation is 2 nm to 15 nm is provided.

6 Claims, 12 Drawing Sheets

Laser light

U.S. PATENT DOCUMENTS

| | | | |
|---|---|---|---|
| 7,041,430 B2 * | 5/2006 | Miyamoto et al. | 430/270.13 |
| 7,407,697 B2 * | 8/2008 | Nishihara et al. | 428/64.1 |
| 2003/0064211 A1 | 4/2003 | Hirotsune et al. | |
| 2004/0027982 A1 | 2/2004 | Hirotsune et al. | |
| 2004/0037203 A1 | 2/2004 | Harigaya et al. | |
| 2004/0130994 A1 | 7/2004 | Hellmig et al. | |
| 2005/0064334 A1 | 3/2005 | Hirotsune et al. | |
| 2005/0202204 A1 * | 9/2005 | Nishihara et al. | 428/64.4 |

FOREIGN PATENT DOCUMENTS

| | | |
|---|---|---|
| JP | 2002-298433 | 10/2002 |
| JP | 2003-45085 | 2/2003 |
| JP | 2003-91872 | 3/2003 |
| JP | 2003-228881 | 8/2003 |
| JP | 2004-47034 | 2/2004 |
| JP | 2004-47038 | 2/2004 |
| JP | 2004-185744 | 7/2004 |
| JP | 2004-348881 | 12/2004 |
| JP | 2005-119263 | 5/2005 |
| JP | 2005-122872 | 5/2005 |
| JP | 2005-190647 | 7/2005 |
| JP | 2005190642 A * | 7/2005 |

OTHER PUBLICATIONS

Machine Translation of detailed description of JP2003-045085 A. Created on Dec. 20, 2010.*

Sigma-aldrich details of Antimony tin oxide from http://www.sigmaaldrich.com/catalog/ProductDetail.do?D7=0&N5=SEARCH_CONCAT_PNO%7CBRAND_KEY&N4=549541%7CALDRICH&N25=0&QS=ON&F=SPEC on Apr. 1, 2011.*

Sigma-Aldrich details of Indium tin oxide from http://www.sigmaaldrich.com/catalog/ProductDetail.do?lang=en&N4=544876|ALDRICH&N5=SEARCH_CONCAT_PNO|BRAND_KEY&F=SPEC on Apr. 1, 2011.*

Oct. 23, 2009 Chinese official action (and English translation thereof) in connection with a counterpart Chinese patent application No. 2006800325172.

European search report in connection with a counterpart European patent application No. 06 79 7583.

* cited by examiner

Laser light

Reflection layer material

Thickness of Cu layer (nm)

MULTILAYER OPTICAL RECORDING MEDIUM AND OPTICAL RECORDING METHOD

TECHNICAL FIELD

The present invention relates to a multilayer optical medium (hereinafter, also sometimes referred to as "multilayer phase change information recording medium", "multilayer phase change optical recording medium", "multilayer optical disc" and a "multilayer phase change optical disc) capable of recording the information by causing optical change in a recording layer material by irradiation of laser light and having multiple recording layers containing a phase change recording layer capable of rewriting the information, and an optical recording method in the optical recording medium.

BACKGROUND ART

In phase change optical discs (phase change optical recording media) such as CD-RW, generally a basic constitution is made by providing a recording layer composed of a phase change material on a plastic substrate and thereon forming a reflection layer which enhances an optical absorption ratio of the recording layer and has a thermal diffusion effect, and the information is recorded and replayed by irradiating the laser light from a substrate side.

Phase change recording materials exhibit the phase change between a crystalline state and an amorphous state by heating with laser light irradiation followed by cooling. When rapidly cooled after rapid heating, they become amorphous whereas when slowly cooled, they are crystallized. The phase change recording medium practically applies this nature to record and replay of the information.

Additionally, for the purpose of blocking oxidation, transpiration and deformation of the recording layer which occur by heating with light irradiation, typically a lower protection layer is provided between the substrate and the recording layer, and an upper protection layer is provided between the recording layer and the reflection layer. These protection layers have regulation functions of optical properties of the optical recording medium, and the lower protection layer also combines with the function to prevent the substrate from softening due to the heat when recorded in the recording layer.

In recent years, along with the increase of information amounts covered by computers, signal recording capacities of rewritable type discs such as DVD-RAM, DVD-RW and DVD+RW have been increased, and density growth of signal information has been advanced. The recording capacity of current CD is about 650 MB, that of DVD is about 4.7 GB, and it is forecasted that the density growth of the recording is highly required in the future. Along with the increase of the information amounts, it appears to also require enhancement of a recording speed. At present, as the rewritable DVD disc, those capable of recording 8 times faster in a monolayer have been developed and practically applied.

As methods to increase the recording density using such a phase change optical recording medium, for example, shortening the laser wavelength used to a blue color area, or enlarging a numeric aperture NA of an objective lens used for pickup which performs record and replay to reduce a spot size of the laser light irradiated to the optical recording medium has been proposed, researched, developed and almost come into practical use.

As the method to increase the recording capacity by improving the optical recording medium itself, various types of dual layer phase change optical recording media made by overlapping two information layers composed of at least the recording layer and the reflection layer at one side of the substrate and adhering these information layers with ultraviolet ray-curable resins have been proposed. A separation layer (sometimes referred to as an intermediate layer) which is an adhered portion between these information layers has the function to optically separate two information layers, and made up of a material which does not absorb the laser light as possible because it is necessary that the laser light used for the record and replay attains abundantly as possible to the information layer at an inner side.

There are still many problems for this dual layer phase change optical recording medium.

For example, if the laser light is not sufficiently transmitted through the information layer (first information layer) at a front side as seen from the side of laser light irradiation, the information can not be recorded in the recording layer of the information layer (second information layer) at the inner side and can not be replayed. Thus, the reflection layer which constitutes the first information layer must be an ultrathin translucent reflection layer. To replay, a high reflectance ratio as possible is required. However, in the optical recording medium having two layers or more of the recording layers and the reflection layers, their optical absorption and optical transmission affect, and the reflectance ratio of the optical recording medium itself becomes low.

Recording in the phase change optical recording medium is performed by irradiating the laser light for a very short time to the phase change material in the recording layer followed by rapid cooling to change the crystal to the amorphous and form a mark. Thus, in the case of the translucent reflection layer with a very thin thickness of about 10 nm, a radiator effect become excessively small compared with the optical recording medium having the monolayer. Therefore, it becomes difficult to form amorphous marks when recorded in the recording layer of the first information layer. As a result, a modulation degree is hardly assured.

In Patent Document 1, the technology in which materials selected from AlN, $Al_2O_3$, $Si_3N_4$, $SiO_2$, $Ta_2O_5$, TaO, $ZrO_2$, ZnO, $TiO_2$, SiC and composite materials thereof are used for a transparent heat release layer (sometimes referred to as an optical transmission layer), and ZnS—$SiO_2$ is used for a transparent dielectric layer (sometimes referred to as a protection layer) has been disclosed, but no special effect of Sn oxide is described.

In Patent Document 2, a multilayer phase change information recording medium in which a thermal diffusion layer (sometimes referred to as an optical transmission layer) contains tin oxide as a major component and at least antimony oxide has been disclosed, but it is not described that the upper protection layer and the thermal diffusion layer, or the lower protection layer and the upper protection layer and the thermal diffusion layer are composed of Sn oxide. The effect in the blue color laser wavelength area at 405 nm is emphasized, and is different from the present invention.

Furthermore in Patent Document 3, a multilayer phase change information recording medium in which the thermal diffusion layer contains ITO (indium oxide-tin oxide) as the major component and at least one of Al and Ga has been disclosed, but it is not described that the upper protection layer and the thermal diffusion layer, or the lower protection layer and the upper protection layer and the thermal diffusion layer are composed of Sn oxide. The effect in the blue color laser wavelength area at 405 nm is emphasized, only the special effect of using ITO for the thermal diffusion layer is described, and this is different from the present invention in constitution.

Patent Document 1: Japanese Patent Application Laid-Open (JP-A) No. 2002-298433
Patent Document 2: JP-A No. 2004-47038
Patent Document 3: JP-A No. 2004-47034

SUMMARY

In an aspect of this disclosure, there is provided a multilayer optical recording medium where a sufficient heat release effect is obtainable even when a thickness of a reflection layer in each information layer other than the innermost information layer as seen from a side of laser light irradiation is ultrathin, a modulation degree is increased to enhance recording performance as well as recording sensitivity in each information layer, storage stability is also excellent and further a light transmittance in each information layer is made high to enhance the recording sensitivity of the innermost information layer as seen from the side of laser irradiation, and an optical recording method in the multilayer optical recording medium. Various other aspects are described herein, such as, for example, the following:

<1> A multilayer optical recording medium including at least multiple information layers;
wherein the multiple information layers comprise at least a phase change recording layer capable of recording information by laser irradiation, and a reflection layer,
wherein each information layer other than an innermost information layer as seen from a side of the laser irradiation comprises a lower protection layer, the phase change recording layer, an upper protection layer, the reflection layer and an optical transmission layer,
the upper protection layer and the optical transmission layer in each information layer other than the innermost one as seen from the side of the laser irradiation are composed of a material containing an Sn oxide, and
a thickness of the upper protection layer in each information layer other than the innermost one as seen from the side of the laser irradiation is 2 nm to 15 nm.

<2> The multilayer optical recording medium according to <1>, wherein the upper protection layer in each information layer other than the innermost one as seen from the side of the laser irradiation contains Sn oxide at 50 mol % to 90 mol %.

<3> The multilayer optical recording medium according to any one of <1> to <2>, wherein a thickness of the optical transmission layer in each information layer other than the innermost one as seen from the side of the laser irradiation is 51 nm to 250 nm.

<4> The multilayer optical recording medium according to any one of <1> to <3>, wherein the reflection layer in each information layer other than the innermost one as seen from the side of the laser irradiation contains Cu as a major component.

<5> The multilayer optical recording medium according to <4>, wherein the reflection layer in each information layer other than the innermost one as seen from the side of the laser irradiation further contains at least one metal element selected from Mo, Ta, Nb, Cr, Zr, Ni, Ge and Au at a ratio of 5% by mass or less.

<6> The multilayer optical recording medium according to any one of <1> to <5>, wherein the lower protection layer in each information layer other than the innermost one as seen from the side of the laser irradiation is composed of an Sn oxide-containing material.

<7> The multilayer optical recording medium according to any one of <1> to <6>, wherein the lower protection layer in each information layer other than the innermost one as seen from the side of the laser irradiation is composed of a dual layer laminate structure and at least one layer of two layers is composed of the Sn oxide-containing material.

<8> The multilayer optical recording medium according to any one of <1> to <7>, having a first substrate, a first information layer, an intermediate layer, a second information layer and a second substrate in this order as seen from the side of the laser irradiation, which is a dual layer optical recording medium wherein the first information layer has a first lower protection layer, a first phase change recording layer, a first upper protection layer, a first reflection layer and a first optical transmission layer in this order as seen from the side of the laser irradiation, and the second information layer has a second lower protection layer, a second phase change recording layer, a second upper protection layer, a second reflection layer and a second optical transmission layer in this order as seen from the side of the laser irradiation.

<9> An optical recording method for the multilayer optical recording medium according to any one of <1> to <8>, including:
irradiating repeatedly pulses modulated by two values of a recording power and a bias power on the recording layer in each information layer other than the innermost one as seen from the side of the laser irradiation, and
setting an interval Tr between upstrokes of a top pulse and a last pulse in the range of the following formula:

$$(n-1.5)T \leq Tr \leq (n-0.5)T$$

when a recording mark of a length nT (T: clock cycle, n: integer of 2 or more) is formed.

<10> The optical recording method according to <9>, wherein when a number of irradiated pulses is m (m is an integer of 1 or more), if n is an even number, a relation of n=2m is satisfied and if n is an odd number, a relation of n=2 m+1 is satisfied, when recording is performed in the recording layer in each information layer which is the second or outer as seen from the side of laser irradiation.

BEST MODES FOR CARRYING OUT THE INVENTION

Multilayer Optical Recording Medium

A multilayer optical recording medium in accordance with an aspect of this disclosure has multiple information layers each containing at least a phase change recording layer capable of recording information by laser irradiation and a reflection layer, wherein each information layer other than the innermost information layer as seen from a side of the laser irradiation has at least a lower protection layer, the phase change recording layer, an upper protection layer, the reflection layer and an optical transmission layer, and further if necessary has the other layers.

Figure 1:
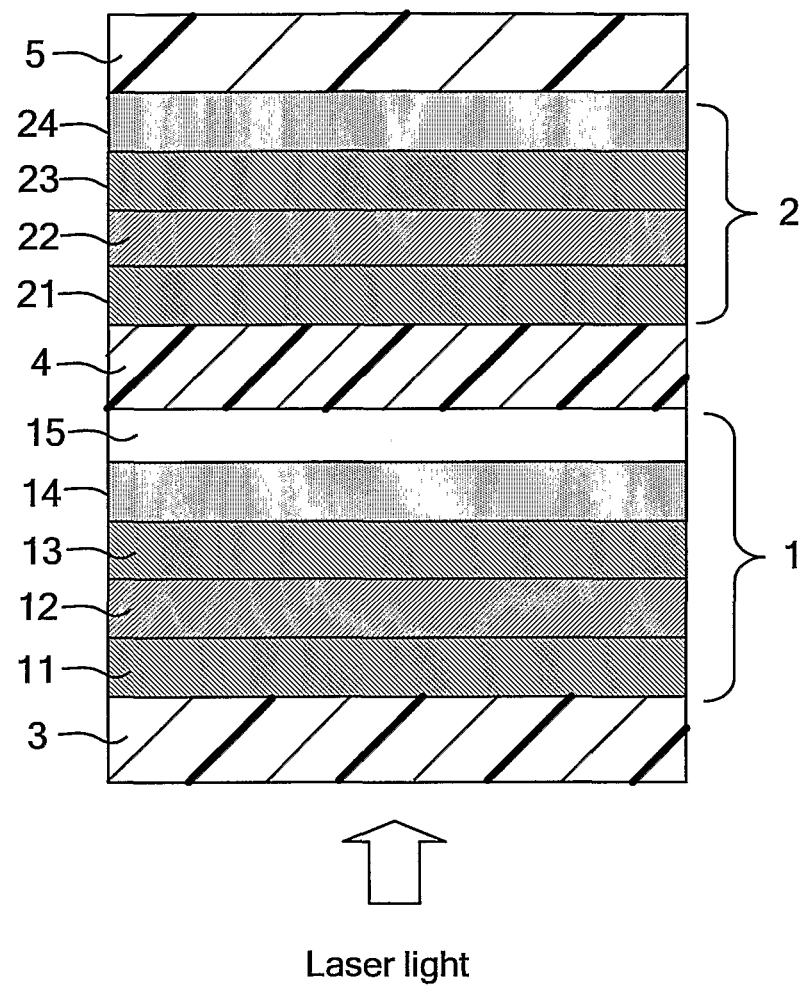
FIG. 1 is a view showing a representative layer constitution of a dual layer phase change optical recording medium which is one example of the present invention.

Here, FIG. 1 is a schematic sectional view of a dual layer optical recording medium according to one embodiment of the present invention. This dual layer optical recording medium laminates a first information layer 1, an intermediate layer 4, a second information layer 2 and a second substrate 5 in this order on a first substrate 3, and further if necessary has the other layers.

The first information layer 1 has a first lower protection layer 11, a first phase change recording layer 12, a first upper protection layer 13, a first reflection layer 14 and a first optical transmission layer 15.

The second information layer 2 has a second lower protection layer 21, a second phase change recording layer 22, a second upper protection layer 23, and a second reflection layer 24.

An interface layer may be provided at least any of between the first upper protection layer 13 and the first reflection layer 14, and between the second upper protection layer 23 and the second reflection layer 24.

In the dual layer optical recording medium, the information layer at the innermost side as seen from the side of the laser irradiation is the second information layer, and the information layer other than the innermost one as seen from the side of the laser irradiation is the first information layer.

Such a dual layer phase change optical recording medium is preferably produced as follows. That is, a production method composed of a film forming step, an initializing step and a cohering step is employed and performed basically in this order.

In the film forming step, the film of the first information layer is formed on the surface provided with a group of the first substrate, and the film of the second information layer is formed on the surface provided with a group of the second substrate.

Respective film layers of the first information layer and the second information layer can be formed by various vapor-phase growth methods, e.g., a vacuum vapor deposition method, a spattering method, a plasma CVD method, an optical CVD method, an ion plating method, and an electron beam vapor deposition method. Among them, the spattering method is excellent in mass productivity and film nature. In the spattering method, the film is generally formed with flowing an inert gas such as argon, and at that time the reaction spattering may be performed with mixing/adding oxygen or nitrogen.

In the initializing step, the entire layer is initialized (recording layer is crystallized) by irradiating energy light such as laser light to the first information layer and the second information layer. When it is likely that the film is buoyed by laser light energy, an overcoat may be given by spin coating an UV resin (ultraviolet ray curable resin) on the first and second information layers and irradiating the ultraviolet ray to cure the rein before the initializing step. After performing the subsequent cohering step in advance, the first and second information layers may be initialized from the side of the first substrate.

In the cohering step, the first information layer and the second information layer are faced each other and the first substrate and the second substrate are pasted via the intermediate layer. For example, the UV resin is applied on any one film surface, the film surfaces are faced each other, to which pressure is applied to cohere, and the ultraviolet ray can be irradiated to cure the resin.

In the optical recording medium having two layers of the information layers as the above, the reflectance ratio becomes low because the layer number is many compared with the monolayer optical recording medium and particularly optical absorption in the recording layer and the reflection layer is affected. When the reflectance ratio is low, an amplitude of replay signals is small. Thus, it becomes very difficult to continue focusing the laser light along a slit in the substrate.

Thus, as an indicator whether the information can be replayed or not even at low reflectance ratio, a value of "reflectance ratio Itop×modulation degree M" (unit: %) is used. The larger this value is, the better the recording performance of the optical recording medium is.

When Itop is a crystalline reflectance ratio after recording in the first information layer and Ibot is an amorphous reflectance ratio after recording in the first information layer, the modulation degree M is represented by (Itop−Ibot)/Itop.

The modulation degree M is preferably 0.55 or more and more preferably 0.55 to 0.70. When the modulation degree is less than 0.55, it sometimes becomes difficult to read out the signals with good quality in the multilayer phase change optical recording medium having the reflectance ratio about one third lower than that in the monolayer phase change optical recording medium because the amplitude of replay signals is not assured.

Here, the reflectance ratio of the optical recording medium can be measured, for example, measuring a reflection intensity of the medium using an evaluating machine for the optical recording medium and calibrating the reflection intensity to the reflectance ratio using the reflectance ratio of a metal thin film (e.g., Ag etc.) for the calibration and the reflection intensity.

The light transmittance of the first information layer after the initialization is preferably 30% to 60% and more preferably 40% to 45%. When the light transmittance is less than 30%, it sometimes becomes difficult to stably record and replay in the inner information layer because the laser light hardly transmits through the inner information layer as seen from the side of laser irradiation and the reflectance ratio in the inner side is lowered. When it exceeds 60%, it sometimes becomes difficult to stably record and replay the information because the light transmittance is too high, thus the laser intensity required for recording the information in the first information layer becomes too high and the reflectance ratio in the first information layer becomes low.

Here, the light transmittance in the first information layer can be measured by measuring the first information layer by Etha-optics supplied from Steag before pasting the two layers.

As recording layer materials used for the present invention, those containing around 70% Sb are preferable. In the optical recording medium having the dual layer recording layer, the high transmittance is required in the first information layer when considering the record and replay in the second information layer. Therefor, it is required to thin the film in the recording layer in parallel with an activity to reduce the absorption ratio of the reflection layer. It is publicly known that thinning the recording layer reduces a crystallization speed, and it is advantageous that the recording layer material itself having the high crystallization speed is used. Thus, an SbTe eutectic composition containing around 70% Sb content is preferable. Specific examples include Ge—Sb—Te, In—Sb—Te, Ag—In—Sb—Te, Ge—In—Sb—Te, Ag—Ge—In—Sb—Te, and Ge—Sn—Sb—Te. As phase change recording materials other than these, Ge—Te, In—Sb, Ga—Sb, Ge—Sb and In—Sb—Ge can be used.

The thickness of the first phase change recording layer is preferably in the range of 5 nm to 10 nm, and the thickness of the second phase change recording layer is preferably in the range of 10 nm to 20 nm Film forming methods for the recording layer include various vapor-phase growth methods, e.g., a vacuum vapor deposition method, a spattering method, a plasma CVD method, an optical CVD method, an ion plating method, and an electron beam vapor deposition method. Among them, the spattering method is excellent in mass productivity and film nature.

To easily perform the recording in the information layer containing such a phase change recording layer, it is necessary to rapidly release remaining heat produced by the light irradiated for forming amorphous marks.

However, the thickness of the first reflection layer can be thickened up to only about 10 nm in association with the light transmittance of the first information layer. Thus the heat release property is poor and the recording in the first recording layer is hardly performed. In particular, the modulation degree is low. Thus, in order to enhance the heat release property, transparent materials having good thermal conductivity are used for the first upper protection layer and the optical transmission layer.

That is, by constituting the first upper protection layer and the optical transmission layer in the first information layer (corresponding to the information layer other than the innermost one as seen from the side of the laser irradiation) with the layer containing the Sn oxide, it is possible to increase the recording sensitivity of the first information layer and enhance the modulation degree by a relatively low recording power. In the conventional monolayer rewritable optical recording medium, ZrIS—SiO$_2$ is mainly used for the upper protection layer. However, in the rewritable optical recording medium having the dual layer information layers, the storage stability can not be assured when ZnS—SiO$_2$ is used for the upper protection layer of the information layer at the front side as seen from the side of the laser irradiation.

However, according to the present invention, the new problem in the optical recording medium having the above dual layer information layers can be solved. Furthermore, since the light transmittance in the first information layer can be increased, the light is easily transmitted through the information layer at the inner side and the recording sensitivity in the second information layer can be enhanced.

Figure 11:
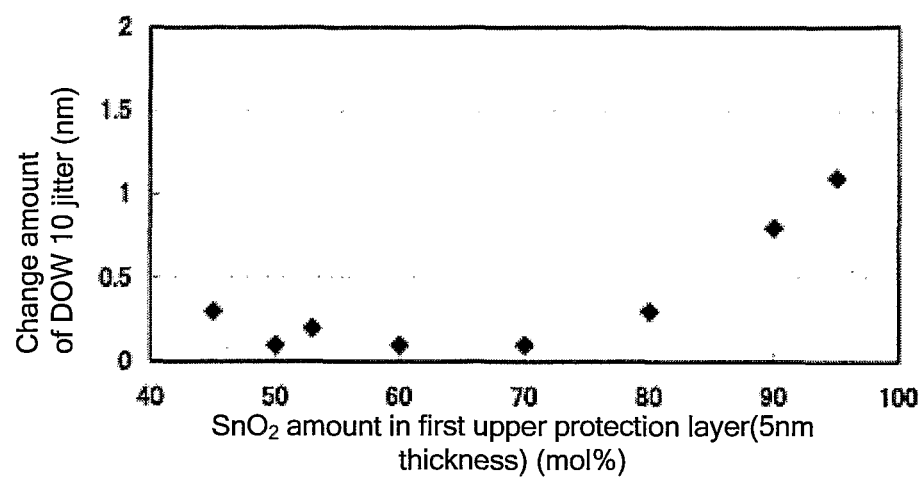
FIG. 11 is a view showing dependency of a DOW10 jitter change amount when stored under the environment at 80° C. and 85% RH for 100 hours on an Sn oxide content in the first upper protection layer (thickness 5 nm).

It is preferable that the first upper protection layer contains 50 mol % or more Sn oxide. When the Sn oxide content is less than 50 mol %, the sufficient crystallization speed is hardly obtained in the first recording layer and repeated recording at high line speed of about 10 m/s in the first information layer becomes difficult. Thus, a jitter when repeatedly recorded 10 times (DOW 10 jitter) is also deteriorated (see FIG. 8 described later). Furthermore, to easily obtain the excellent storage stability, it is preferable to make the content of Sn oxide 90 mol % or less (see FIG. 11 described later). That is, as shown in FIGS. 8 and 11, to balance the recording property of DOW 10 jitter 10% or less and the storage stability of DOW 10 jitter change amount less than 1%, the content of Sn oxide is preferably in the range of 50 mol % to 90 mol % and more preferably 50 mol % to 70 mol %.

Figure 8:
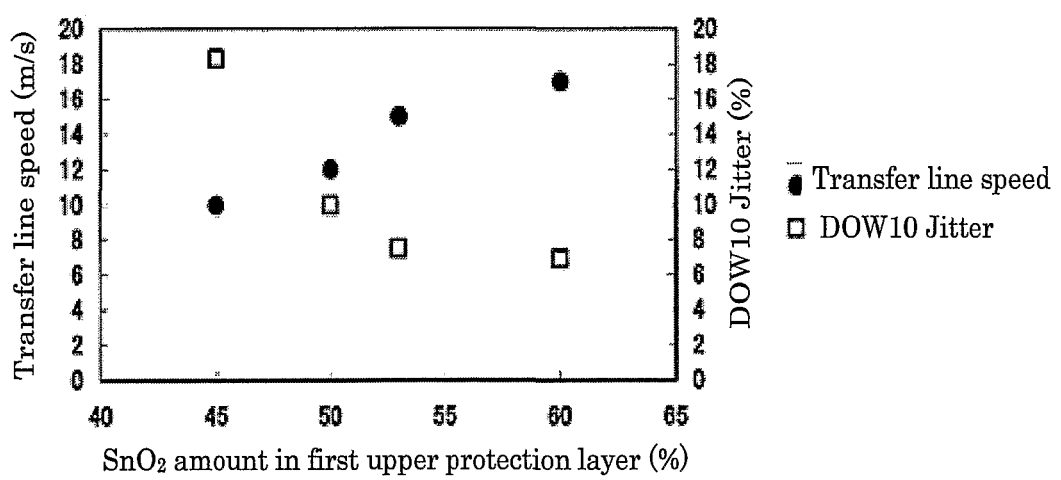
FIG. 8 is a view showing dependency of transfer line speed and DOW 10 jitter on an $SnO_2$ amount in a first upper protection layer.
Figure 9:
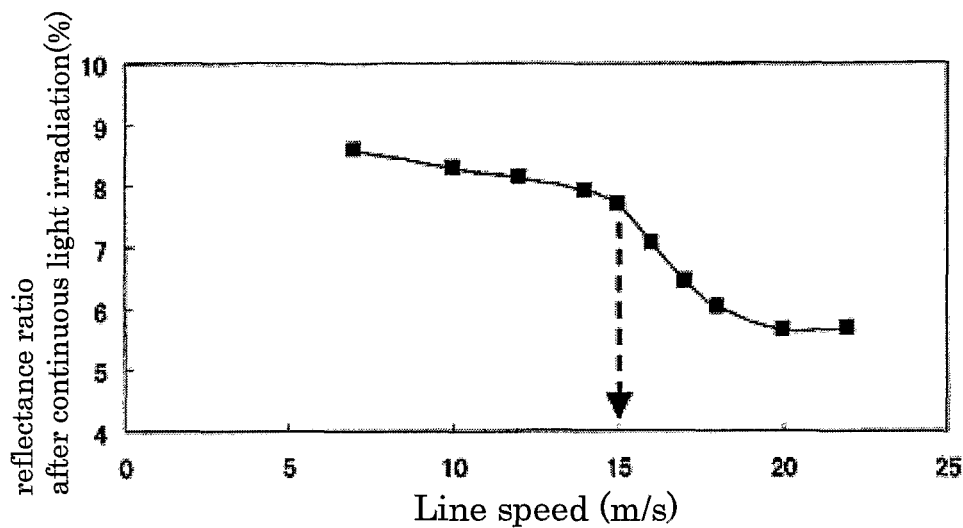
FIG. 9 is a view illustrating the transfer line speed.

Here, the "transfer line speed" shown in FIG. 8 refers to the line speed at which the reflectance ratio begins to change when continuous light (power was 15 mW) is irradiated to a track which is in the crystalline state due to the initialization with changing the line speed of the recording medium. In an example in FIG. 9 (example of experimenting with a medium having a layer constitution used in Example 2), the transfer line speed is 15 m/s as shown by an arrow. The transfer line speed is an alternative value of the crystallization speed in the recording layer and is an important design issue for accomplishing the objective recording speed.

As described above, in JP-A No. 2002-298433, it has been described to use the material selected from AlN, Al$_2$O$_3$, Si$_3$N$_4$, SiO$_2$, Ta$_2$O$_5$, TaO, ZrO$_2$, ZnO, TiO$_2$, SiC and composite materials thereof for the transparent heat release layer (optical transmission layer). However, in any cases, the Itop×M value is low because the modulation degree is hardly taken. There is also a problem in that the transmittance is hardly assured.

In the present invention, by the use of the dielectric material containing Sn oxide for the optical transmission layer, it is possible to increase the modulation degree and assure the high light transmittance. In$_2$O$_3$, ZnO, Ta$_2$O$_5$, and SiO$_2$ and the like may be added in addition to Sn oxide.

When Sn oxide is used for the first lower protection layer, the first upper protection layer and the optical transmission layer, the thickness of the optical transmission layer is preferably in the range of 51 nm to 250 nm and more preferably 55 nm to 70 nm. When the thickness is less than 51 nm, no sufficient heat release effect is obtained to make the recording difficult. When it exceeds 250 nm, the sufficient heat release effect is obtained, but the light transmittance is lowered and the recording sensitivity in the second information layer becomes poor, which is not preferable. When the thickness is set up in the above range, it is possible to make the light transmittance 40% to 60%. In JP-A No. 2002-298433, it is described that it is preferable that the thickness is 50 nm or less in the case of using the materials described above as the transparent heat release layer (corresponding to the optical transmission layer of the present invention), but the heat release property is insufficient in such a thin film.

For the second upper protection layer, Sn oxide may be used, and ZnS—$SiO_2$ may also be used as conventional. When recorded in the second phase change recording layer, the second reflection layer can be made sufficiently thick to obtain the sufficient heat release property, and thus, ZnS—$SiO_2$ may be used. But, when ZnS—$SiO_2$ is used for the second upper protection layer and Ag is used for the second reflection layer, it is preferable that the interface layer composed of TiC (70 mol %)-$TiO_2$ (30 mol %) is sandwiched with them. This is for preventing that reliability of the medium is inhibited by reacting Ag and S.

The thickness of the second upper protection layer is typically preferably about 3 nm to 30 nm and more preferably 15 nm to 30 nm.

The first lower protection layer is preferably composed of the material which is transparent, passes the light well, and whose melting point is higher than that of the recording layer. Metal oxide, nitride, sulfide and carbide which have actions of preventing deterioration and modification of the recording layer, enhancing adhesion strength to the recording layer and enhancing the recording property are primarily used. Specific examples include metal oxide such as SiO, $SiO_2$, ZnO, $SnO_2$, $Al_2O_3$, $TiO_2$, $In_2O_3$, MgO and $ZrO_2$, nitride such as $Si_3N_4$, AlN, TiN, BN and ZrN, sulfide such as ZnS, $In_2S_3$ and $TaS_4$, carbide such as SiC, TaC, $B_4C$, WC, TiC and ZrC, diamond like carbon, and mixtures thereof. These materials may be used alone or in mixture of one another. Impurities may also be contained as needed As the lower protection layer in the conventional first information layer, ZnS—$SiO_2$ is often used as shown in JP-A No. 2002-298433, and in that case, a mixed ratio is preferably ZnS (80 mol %)-$SiO_2$ (20 mol %). Since this material has a high refraction index n and an extinction coefficient k of almost zero, it is possible to increase absorption efficiency of the light in the recording layer, and since the thermal conductivity is small, it is possible to appropriately inhibit the diffusion of the heat produced by the optical absorption. Therefore, the temperature of the recording layer can be raised up to the temperature capable of being melted.

However, in the present invention, by making not only the first upper protection layer and the optical transmission layer but also the first lower protection layer Sn oxide, it is also possible to enhance the recording sensitivity. The first lower protection layer may also be made into a dual layer laminate structure. In that case, one layer of two layers could be composed of the material whose major component is Sn oxide.

The thickness of the first lower protection layer is preferably 40 nm to 80 nm and more preferably 60 nm to 80 nm.

The thickness of the first upper protection layer may be typically about 2 nm to 30 nm, but in order to obtain not only the recording property but also the excellent storage stability, it is necessary to make 2 nm to 15 nm. When the thickness is thicker than 15 nm, no excellent storage stability is obtained (see FIG. 10 described later). When it is thinner than 2 nm, the storage stability is obtained, but the reflectance ratio becomes high and the modulation degree can not be assured (see FIG. 17 described later).

The recording property when Sn oxide has been used or has not been used for the optical transmission layer, the first upper protection layer and the first lower protection layer in the first information layer will be described with reference to FIGS. 6 and 7 in Examples described later.

The second lower protection layer is preferably formed of the material which is transparent, passes the light well and has the melting point higher than that of the recording layer. The material has actions of preventing deterioration and modification of the recording layer, enhancing the adhesive strength to the recording layer and enhancing the recording property. As such a material, metal oxide, nitride, sulfide and carbide are mainly used. Specific examples include metal oxide such as SiO, $SiO_2$, ZnO, $SnO_2$, $Al_2O_3$, $TiO_2$, $In_2O_3$, MgO and $ZrO_2$, nitride such as $Si_3N_4$, AlN, TiN, BN and ZrN, sulfide such as ZnS, $In_2S_3$ and $TaS_4$, carbide such as SiC, TaC, $B_4C$, WC, TiC and ZrC, diamond like carbon, and mixtures thereof. These materials can be used alone to form the protection film, but the mixture of one another may also form the protection film. Impurities may also be contained as needed.

Examples of the mixture include ZnS—$SiO_2$ by mixing ZnS and $SiO_2$ and $Ta_2O_5$—$SiO_2$ by mixing $Ta_2O_5$ and $SiO_2$. In particular, ZnS—$SiO_2$ is often used, and in that case, the mixture ratio (molar ratio) of $(ZnS)_{80}(SiO_2)_{20}$ is the most preferable. In this material, the reflection index n is high, the extinction coefficient k is almost zero, the absorption efficiency of the light in the recording layer can be enhanced and the diffusion of the heat produced by optical absorption can be properly inhibited because the thermal conductivity is small. Thus, the material can raise the temperature up to the temperature capable of melting the recording layer.

Typically, the thickness of the second lower protection layer is preferably about 110 nm to 160 nm.

The film forming methods for the above protection layer include various vapor-phase growth methods, e.g., a vacuum vapor deposition method, a sputtering method, a plasma CVD method, an optical CVD method, an ion plating method, and an electron beam vapor deposition method. Among them, the spattering method is excellent in mass productivity and film nature.

Furthermore, by containing Cu as a major component in the first reflection layer, it becomes possible to make the transmittance in the first information layer and the recording property and the storage property in the first recording layer better. Here, containing Cu as the major component in the first reflection layer means that Cu is contained at 95% by mass or more.

Reasons whey the first reflection layer mainly composed of Cu is suitable will be described below.

In the phase change optical recording medium having the dual layer recording layer as in FIG. 1, it is necessary that the laser light for record and replay is transmitted through the first information layer as much as possible to reach the second information layer. Therefore, as an issue to be considered in the case of the first reflection layer, the material in which the light is hardly absorbed and is easily transmitted is preferable in the first reflection layer.

Thus, the present inventors optically measured various reflection layer films at a wavelength of 600 nm. Here, A (absorption ratio), R (reflectance ratio) and T (transmittance) were measured. Samples for the measurement were obtained by forming each metal film with a thickness of 10 nm on a polycarbonate substrate with a thickness of 0.6 mm.

Figure 2:
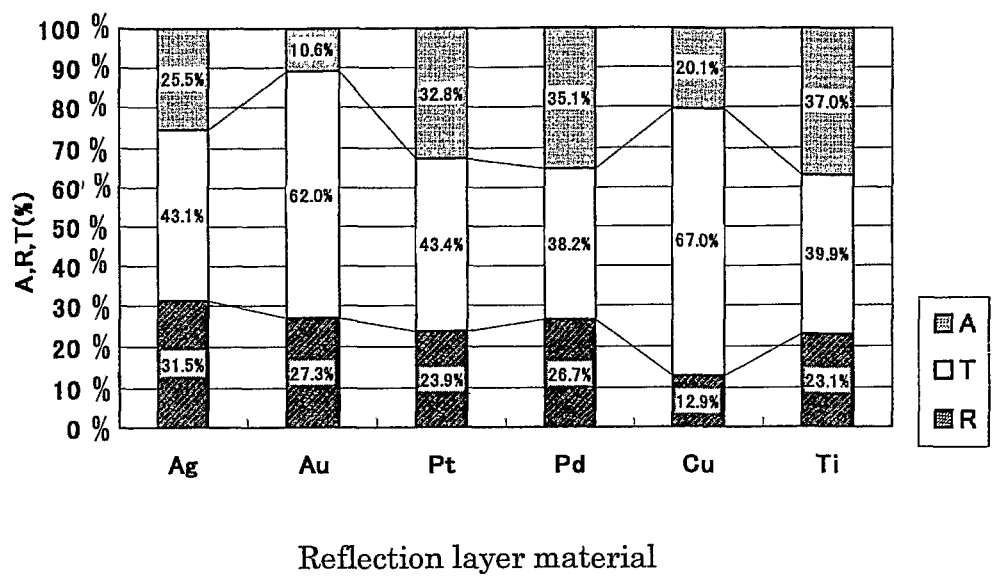
FIG. 2 is a view showing an absorption ratio A, a reflectance ratio R and a Transmittance T of reflection layer materials.

The results were as shown in FIG. 2. From these results, Pt, Pd and Ti have the low transmittance and the high absorption ratio, and thus are predicted not to be preferable as the first reflection layer.

Figure 3:
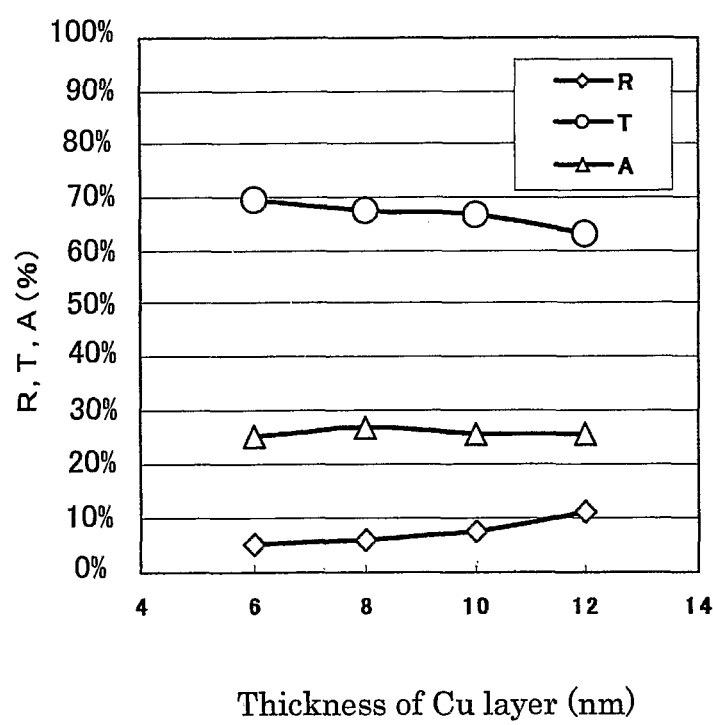
FIG. 3 is a view showing thickness dependency of the reflectance ratio R, the transmittance T and the absorption ratio A of Cu alloy at a wavelength of 660 nm.
Figure 4:
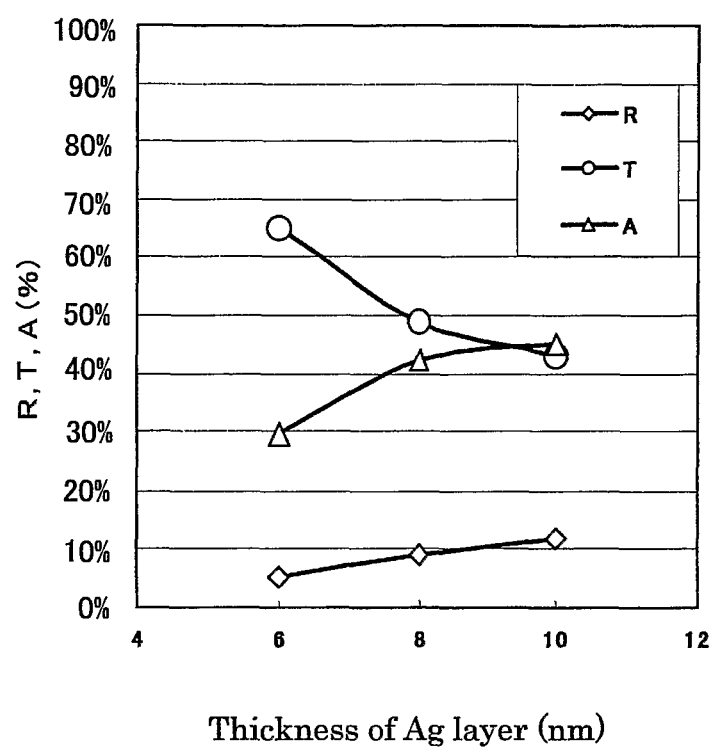
FIG. 4 is a view showing thickness dependency of the reflectance ratio R, the transmittance T and the absorption ratio A of Ag alloy at a wavelength of 660 nm.

Subsequently, for Ag and Cu which have the relatively high transmittance and the relatively low absorption ratio, the measurement was performed by changing the thickness, and the results shown in FIGS. 3 and 4 were obtained. It was found that the change due to the thickness was larger in Ag. From this, it has been shown that the stability of the optical coefficient for the thickness when formed into the film is more excellent in Cu. When C/N (ratio of carrier to noise) of 3T for the laser light at a wavelength of 660 nm used in DVD media was measured using Ag, Cu and Au, it was found that Cu was the most excellent.

Figure 5:
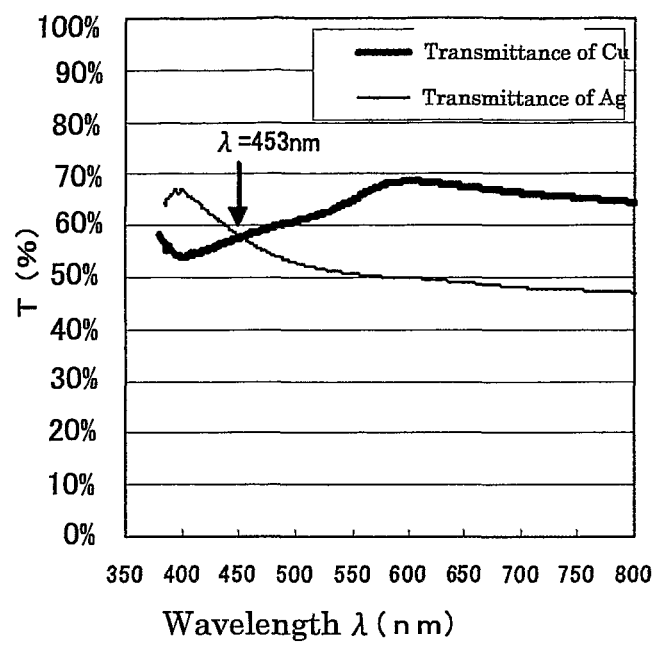
FIG. 5 is a view showing wavelength dependency of the transmittance of a Cu based material and an Ag based material.

Furthermore, the results of a spectral transmittance measured when the thickness was 8 nm are shown in FIG. 5, and it has been shown that the transmittances of Ag and Cu are intersected in the wavelength area of about 450 nm. From this, it has been found that Cu has higher transmittance in the wavelength area longer than about 450 nm and that Cu is more suitable as the first reflection layer for the laser light around 660 nm.

In order to make the storage property better, a small amount of metal elements at 5.0% by mass or less may be added to Cu in the first reflection layer. As the small amount of the metal elements, at least one selected from Mo, Ta, Nb, Cr, Zr, Ni, Ge and Au is preferable. In this case, it is possible to make the storage property better without deteriorating the recording property compared with the use of Cu alone.

Ta and Nb are the metals which have strong affinity with oxygen and nitrogen, and are sometimes used as getter materials for oxygen and nitrogen. Originally, the deterioration of the metal layer is often attributed to chemical oxidation, and particularly in the case of Cu, a reactant known as patina is an oxide. In this point, Ta and Nb have the effect on the deterioration of Cu.

Concerning Mo, Zr, Cr, Ni, Ge and Au, when these metals are added, an alloy with Cu is precipitated on the film surface or a crystal grain boundary of Cu to inhibit diffusion of Cu in the grain boundary. Thus, the migration and the deterioration of Cu are inhibited.

The thickness of the first reflection layer is preferably in the range of 6 nm to 12 nm.

The second reflection layer need not be translucent as the first reflection layer, and is not particularly limited as long as it is the metallic material. Its thickness is preferably in the range of 100 nm to 200 nm and more preferably 120 nm to 150 nm.

The film forming methods of the reflection layer as the above include various vapor-phase growth methods, e.g., a vacuum vapor deposition method, a spattering method, a plasma CVD method, an optical CVD method, an ion plating method, and an electron beam vapor deposition method. Among them, the spattering method is excellent in mass productivity and film nature.

It is required for the first substrate to sufficiently transmit the irradiated light for record and replay, and those conventionally known in the art are applied to the first substrate. As the material, typically glass, ceramics or resins are used, and the resin is suitable in terms of molding property and cost.

The resins include, for example, polycarbonate resins, acryl resins, epoxy resins, polystyrene resins, acrylonitrile-styrene copolymer resins, polyethylene resins, polypropylene resins, silicone-based resins, fluorine-based resins, ABS resins and urethane resins. Polycarbonate resins and acrylic resins such as polymethyl methacrylate (PMMA) which are excellent in terms of molding property, optical property and cost are preferable.

On the surface of the first substrate on which the information layer is formed, a concavoconvex pattern which is a spiral shaped or concentric shaped groove for tracking the laser light and is typically referred to as a groove portion or a land portion may be formed as needed. This is typically formed by an injection molding method or a photopolymer method. The thickness of the first substrate is preferably about 10 µm to 600 µm, and more preferably 550 µm to 590 µm.

As the second substrate, the same material as in the first substrate may be used, but the material opaque for the record replay light may be used, and the second substrate may be different from the first substrate in material quality and groove shape.

The thickness of the second substrate is not particularly limited, can be appropriately selected depending on the purpose, and it is preferable to select the thickness of the second substrate so that the total with the thickness of the first substrate is 1.2 mm.

In the intermediate layer, it is preferable that the optical absorption at the wavelength of the light irradiated for the record and replay is small. Resins are preferable as the material in terms of molding property and cost, and ultraviolet ray curable resins, slow-acting resins and thermoplastic resins can be used.

In the second substrate and the intermediate layer, the concavoconvex pattern such as groove and guide groove formed by the injection molding method or the photopolymer method may be formed in the same way as in the first substrate.

The intermediate layer can optically separate the first information layer and the second information layer by recognition of them by a pickup when recorded and replayed. Its thickness is preferably 10 µm to 70 µm and more preferably 30 µm to 60 µm. When the thickness is thinner than 10 µm, crosstalk between the information layers occurs sometimes. When it is thicker than 70 µm, spherical aberration occurs when recorded and replayed in the second recording layer, and the record and replay tend to become difficult.

(Optical Recording Method)

When the recording is performed for the multilayer optical recording medium of the present invention, by employing the recording method of the present invention, it is possible to enhance the recording property of the recording layer other than the innermost one as seen from the side of light irradiation of the multilayer optical recording medium.

Figure 12:
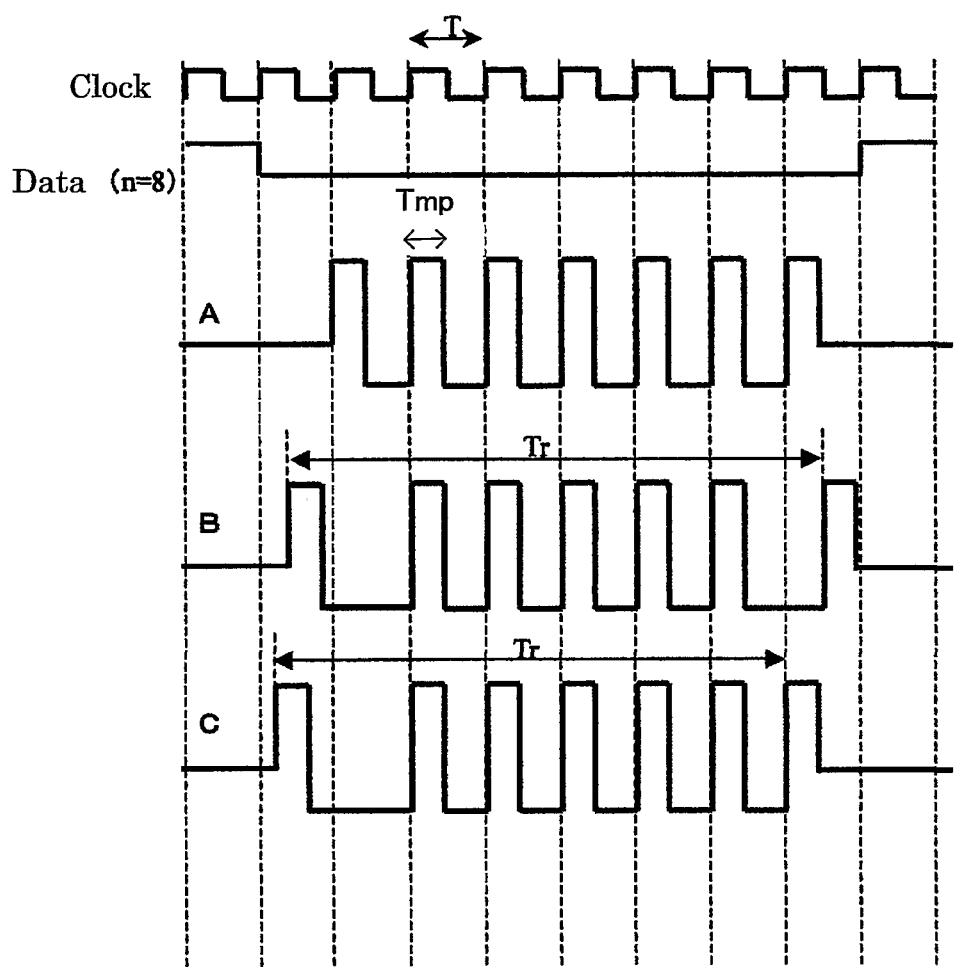
FIG. 12 is a view showing 1T strategy (A) of a conventional monolayer optical recording medium, and recording methods (B and C) for a recording layer other than the innermost one of a dual layer optical recording medium.

As shown in FIG. 12, in the conventional monolayer type rewritable optical recording medium such as DVD+RW, for example, when a 1T cycle strategy (pulse trains of n−1 are used when marks of nT are recorded) is used, the recording is typically started from a time position which has delayed by 1T for the data (see A in FIG. 12). However, as the recording method for the recording layer other than the innermost one as seen from the side of light irradiation of the multilayer optical recording medium having two or more layers of the phase change recording layers, it is better to use the method in which a time width Tr which is the interval between the top pulse upstroke and the last pulse upstroke is widened as shown in B or C in FIG. 12 when the mark with a length nT is formed.

Because, the film of the thick metal layer can not be formed because the high transmittance is necessary to be assured, and the heat release effect is compensated by the use of the transparent dielectric material in the information layers other than the innermost one as seen from the side of light irradiation of the multilayer optical recording medium. If the metal layer is thickened, the sufficient heat release effect is obtained and the recording mark is easily formed. However, when the transparent dielectric material is used, the sufficient heat release effect is not obtained because the thermal conductivity becomes lower than in the metal, and the amorphous mark is easily recrystallized. Thus, the mark with desired length is obtained by setting Tr widely.

In this optical recording method, the top pulse may be upstroked early and the last pulse may be upstroked slowly as B in FIG. 12. Alternatively, only the top pulse may be upstroked early as C in FIG. 12.

The range of Tr value may be $(n-1.5)T \leq Tr \leq (n-0.5)T$. For example, when 8T mark is recorded, Tr which satisfies $6.5T \leq Tr \leq 7.5T$ is used.

Furthermore, in order to make the formation area of the amorphous mark large (thick) as possible, it is necessary to take a long cooling time after heating. Therefore, it is preferable that a recording pulse width (Trap) is made small as possible. When a clock cycle is T, it is preferable to satisfy $0.12 \leq Tmp/cycle$ of recording pulse$) \leq 0.3$ regardless of a recording speed.

When (Trap/cycle of recording pulse) is shorter than 0.12, a high recording power is required. In particular, when the recording speed is as fast as about 9.2 m/s and when recorded by 1T cycle, because of the clock cycle T=15.9 nsec, Tmp=0.12T=1.9 nsec. Thus, in the recording apparatus, response time (upstroke and downstroke times) of laser emitted from LD (laser diode) is too late, and it becomes difficult to record with the desired recording power. When (Tmp/cycle of recording pulse) is longer than 0.3, because of short cooling time, recrystallization by remaining heat of the subsequent pulse occurs, and the desired modulation degree can not be assured.

Figure 13:
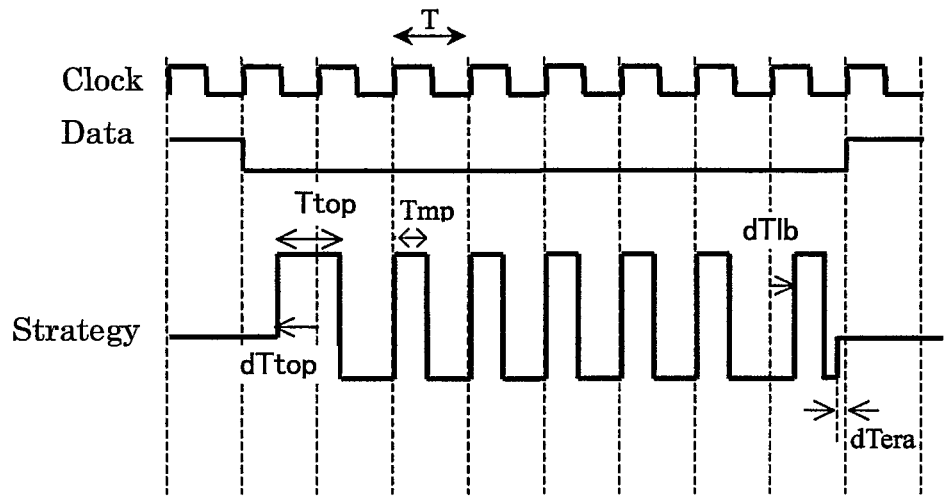
FIG. 13 is a view showing parameters of the 1T strategy.

Generally it is preferable to use parameters of the recoding pulse strategy shown in FIG. 13 as the range of the above Tr is kept, but the recording strategy is not limited thereto. For example, in DVD, since 3T mark and 4T mark appear more frequently than other long marks, they affect the recording property (jitter) most frequently. Thus, limiting to the recording of the 3 mark and the 4T mark, it is possible to set up the parameters individually, e.g., (dTtop3), (dTtop4), (dTlp3), (dTlp4), (dTare3) and (dTera4).

Furthermore, by the optical recording method of the present invention, it is possible to make the recording sensitivity better.

In the second and outer layers on the multilayer optical recording medium, the recording power which is twice or more compared with the monolayer optical recording medium is required because the laser light must be transmitted through the first layer. Thus, it is favorable to lower the required recording power as possible. The cooling time can be made longer by not irradiating the pulse of the 1T cycle as in FIG. 12 but reducing the number of the pulses. Thus, it is possible to reduce the recording power required for forming the amorphous mark by about 10% (see FIGS. 14 and 15).

Figure 14:
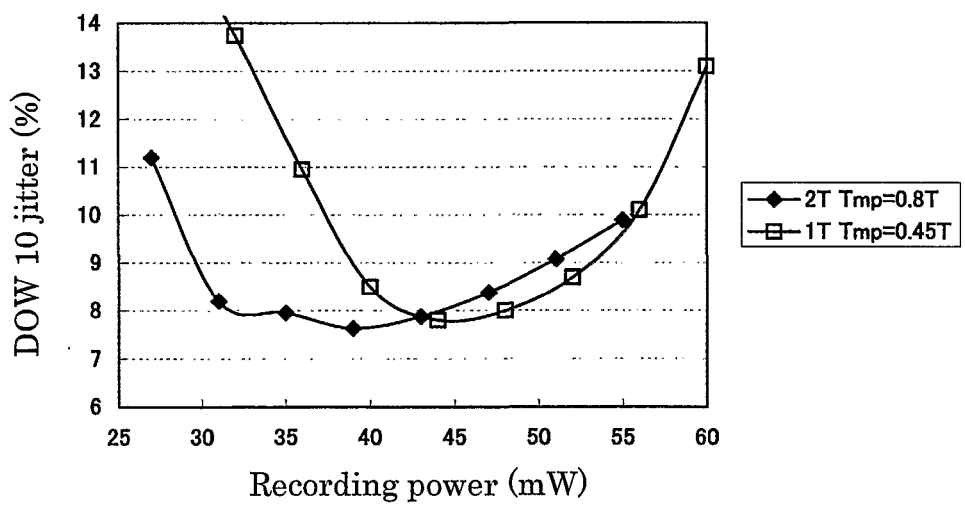
FIG. 14 is a view showing comparison of DOW 10 jitters when recorded in the inner recording layer of the dual layer optical recording medium by 1T cycle strategy and 2T cycle strategy.
Figure 15:
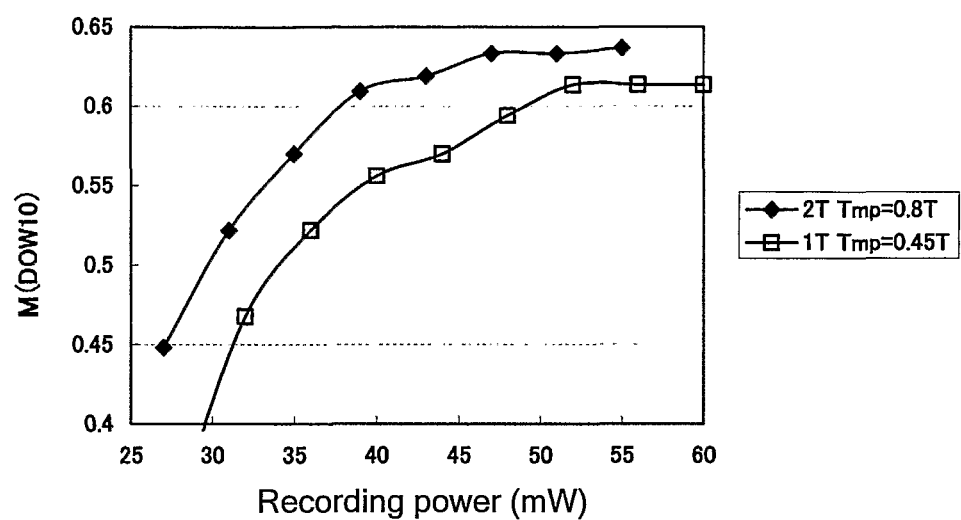
FIG. 15 is a view showing comparison of modulation degrees (DOW 10) when recorded in the inner recording layer of the dual layer optical recording medium by 1T cycle strategy and 2T cycle strategy.
Figure 16:
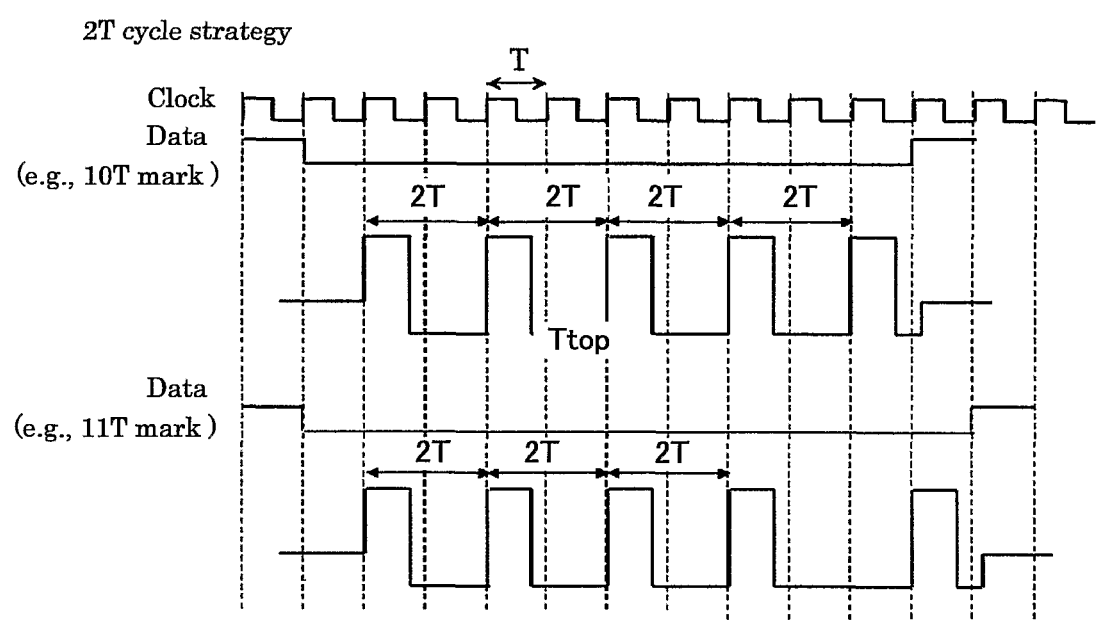
FIG. 16 is a view illustrating the 2T cycle strategy (example of 10T mark and 11T mark).

FIGS. 14 and 15 are the data when recording repeatedly 10 times (DOW 10) was performed at recording line speed of 9.2 m/s in the second recording layer of the dual layer optical recording medium made in Example 35. When recorded by the 1T cycle strategy, the pulse width was 0.45T, and when recorded by the 2T cycle strategy, the pulse width was 0.8T. A specific example of the 2T cycle strategy where when the amorphous mark with a length of nT was formed, if the number of the irradiated pulses was m (m is an integer of 1 or more), when n is an even number, the relation of n=2m is satisfied and when n is an odd number, the relation of n=2 m+1 is satisfied was shown in FIG. 16. In the figure, the number of the pulses is shown to be 5 in any of the cases of recording the mark with a length of 10T and recording the mark with a length of 11T. When the odd number mark such as 11T mark is recorded, a wave profile where the last pulse is shifted backward by about 1T as shown in the figure could be used.

According to the present invention, it is possible to provide the multilayer phase change optical recording medium where the recording performance has been enhanced as well as the recording sensitivity has been enhanced by obtaining the sufficient heat release effect even when the thickness of the reflection layer in each information layer other than the innermost one as seen from the side of the irradiation of laser light is ultrathin and increasing the modulation degree, the storage stability is excellent, and further the recording sensitivity in the innermost information layer as seen from the side of the irradiation of laser light has been enhanced by increasing the light transmittance of each information layer, and the optical recording method thereof.

The present invention will be more specifically described below by Examples and Comparative Examples, but the present invention is not limited thereto. The dual layer phase change optical recording media made in Examples and Comparative Examples have the constitution shown in FIG. 1 (but, having the interface layer between the second reflection layer and the second upper protection layer).

A DVD sprinter supplied from Unaxis as a spattering apparatus was used for film formation, and a DC and RF magnetron spattering method was employed.

ODU-1000 supplied from PULSETEC was used for an evaluation apparatus, and the condition where a laser wavelength irradiated when recorded was 660 nm, a numerical aperture NA of objective lens=0.65 and replay light power=1.2 mW was employed. The recording strategy was the 1T cycle strategy. The strategy used is as shown in Table 1 when represented by the parameters shown in FIG. 13. Numerical values in the table represent the time using [1/16]T as a unit. For example, "3" means [3/16]T. "-" before the numerical value means temporally delaying from the basic position.

TABLE 1

| Parameter | Unit [1/16]T |
|---|---|
| Ttop | 3 |
| Tmp | 3 |
| dTtop | 10 |
| dTtop, 3 | 8 |
| dTlp | −8 |
| dTlp, 3 | −7 |
| dTlp, 4 | −7 |
| dTera | 5 |

EXAMPLES 1 TO 21 AND COMPARATIVE EXAMPLES 1 TO 5

A recording line speed when recorded in the first recording layer was 9.2 m/s. Random recordings were performed repeatedly 10 times (DOW 10) on three tracks, and the middle track among them was replayed. The random recording means that 10 type marks of 3T to 11T and 14T and space are irregularly recorded.

In the evaluation criteria, the recording power where the light transmittance in the first information layer was 40% or more and the modulation degree was saturated was rendered the optimal recording power Ppo[mW], the modulation degree when recorded in the first information layer by Ppo was M (DOW 10) and a crystalline reflectance ratio after recording was Itop (DOW 10). The case of "M≧0.55 and Itop×M≧4.0%" was determined as A, the case of "M≧0.55 and 4.0%<Itop≧3.5%" was determined as B, and the cases other than these were determined as C.

Evaluation results were collectively shown in Table 2.

EXAMPLE 1

A first information layer was made by forming a first lower protection layer with a thickness of 60 nm composed of ZnS (80 mol %)-SiO$_2$ (20 mol %), a first recording layer with a thickness of 7.6 nm composed of Ag$_{0.2}$In$_{3.5}$Sb$_{69.2}$Te$_{21.1}$Ge$_6$, a first upper protection layer with a thickness of 5 nm composed of In$_2$O$_3$ (7.5 mol %)-ZnO (22.5 mol %)-SnO$_2$ (60 mol %)-Ta$_2$O$_5$ (10 mol %), a first reflection layer with a thickness of 8 nm composed of a material in which Mo at 1.1% by mass had been added to Cu and an optical transmission layer with a thickness of 80 nm composed of In$_2$O$_3$ (7.5 mol %)-ZnO (22.5 mol %)-SnO$_2$ (60 mol %)-Ta$_2$O$_5$ (10 mol %) in this order in an Ar gas atmosphere by the spattering method on a first substrate composed of a polycarbonate resin with a diameter of 12 cm and a thickness of 0.58 mm having asperity of a tracking guide formed of continuous groove with a track pitch of 0.74 μm on one side.

A second information layer was made by forming a second reflection layer with a thickness of 140 nm composed of Ag, an interface layer with a thickness of 4 nm composed of TiC (70 mol %)-TiO2 (30 mol %), a second upper protection layer with a thickness of 20 nm composed of ZnS (80 mol %)-SiO$_2$ (20 mol %), a second recording layer with a thickness of 15 nm composed of Ag$_{0.2}$In$_{4.98}$Sb$_{68.61}$Te$_{23.95}$Ge$_{2.26}$ and a second lower protection layer with a thickness of 140 nm composed of ZnS (80 mol %)-SiO$_2$ (20 mol %) in this order in an Ar gas atmosphere by the spattering method using the same substrate as the first substrate as a second substrate.

Subsequently, a dual layer phase change optical recording medium having two information layers was made by applying an ultraviolet ray curable resin (Kayarad DVD802 supplied from Nippon Kayaku Co., Ltd.) on a film side of the first information layer, pasting and spin-coating the second information layer of the second substrate therewith, and then curing the resin by irradiating the ultraviolet ray from the first substrate side to make an intermediate layer. The thickness of the intermediate layer was 55 μm.

Subsequently, the laser light was irradiated from the first substrate side to the first information layer and the second information layer to perform the initialization. The initialization was performed by collecting the laser light emitted from the semiconductor laser (emission wavelength: 810±10 nm) by light pickup (numerical aperture NA=0.55). In the initialization condition for the first recording layer, the optical recording medium was rotated by CLV (line speed constant) mode, the line speed was 6.8 m/s, a feeing amount was 68 μm/rotation, an initialization power was 1300 W, and a radius position 23 mm to 59 mm was entirely initialized. In the initialization condition for the second recording layer, the optical recording medium was rotated by CLV (line speed constant) mode, the line speed was 7 m/s, the feeing amount was 60 μm/rotation, the initialization power was 1570 W, and the radius position 23 mm to 59 mm was entirely initialized. For the order of the initialization, the second information layer was initialized, and then the first information layer was initialized. The light transmittance in the first information layer after the initialization was 43.2%.

EXAMPLE 2

A dual layer phase change optical recording medium was made in the same way as in Example 1 except that the thickness of the optical transmission layer in the first information layer was changed to 60 nm in Example 1. The light transmittance in the first information layer after the initialization was 43.8%.

EXAMPLE 3

A dual layer phase change optical recording medium was made in the same way as in Example 1 except that the thickness of the optical transmission layer in the first information layer was changed to 51 nm in Example 1. The light transmittance in the first information layer after the initialization was 41.8%.

EXAMPLE 4

A dual layer phase change optical recording medium was made in the same way as in Example 1 except that the thickness of the optical transmission layer in the first information layer was changed to 240 nm in Example 1. The light transmittance in the first information layer after the initialization was 41.7%.

EXAMPLE 5

A dual layer phase change optical recording medium was made in the same way as in Example 1 except that the thickness of the optical transmission layer in the first information layer was changed to 250 nm in Example 1. The light transmittance in the first information layer after the initialization was 40.7%.

EXAMPLE 6

A dual layer phase change optical recording medium was made in the same way as in Example 1 except that the material of the first lower protection layer in the first information layer was changed to In$_2$O$_3$ (7.5 mol %)-ZnO (22.5 mol %)-SnO$_2$ (60 mol %)-Ta$_2$O$_5$ (10 mol %) and its thickness was changed to 80 nm in Example 1. The light transmittance in the first information layer after the initialization was 43.1%.

EXAMPLE 7

A dual layer phase change optical recording medium was made in the same way as in Example 1 except that the material of the first lower protection layer in the first information layer was changed to a dual layer structure in which In$_2$O$_3$ (7.5 mol %)-ZnO (22.5 mol %)-SnO$_2$ (60 mol %)-Ta$_2$O$_5$ (10 mol %) with a thickness of 60 nm and ZnS (80 mol %)-SiO$_2$ (20 mol %) with a thickness of 20 nm were laminated from the substrate side in Example 1. The light transmittance in the first information layer after the initialization was 42.8%.

EXAMPLE 8

A dual layer phase change optical recording medium was made in the same way as in Example 1 except that the material of the optical transmission layer in the first information layer was changed to In$_2$O$_3$ (16 mol %)-ZnO (14 mol %)-SnO$_2$ (70 mol %) and its thickness was changed to 60 nm in Example 1. The light transmittance in the first information layer after the initialization was 43.1%.

EXAMPLE 9

A dual layer phase change optical recording medium was made in the same way as in Example 1 except that the material of the optical transmission layer in the first information layer was changed to In$_2$O$_3$ (16 mol %)-ZnO (14 mol %)-SnO$_2$ (70 mol %) and its thickness was changed to 65 nm in Example 1. The light transmittance in the first information layer after the initialization was 42.9%.

EXAMPLE 10

A dual layer phase change optical recording medium was made in the same way as in Example 1 except that the material of the optical transmission layer in the first information layer was changed to $In_2O_3$ (16 mol %)-ZnO (14 mol %)-$SnO_2$ (70 mol %) and its thickness was changed to 70 nm in Example 1. The light transmittance in the first information layer after the initialization was 42.7%.

EXAMPLE 11

A dual layer phase change optical recording medium was made in the same way as in Example 1 except that the material of the optical transmission layer in the first information layer was changed to $In_2O_3$ (8.8 mol %)-ZnO (41.7 mol %)-$SnO_2$ (35.2 mol %)-$SiO_2$ (14.3 mol %) and its thickness was changed to 60 nm in Example 1. The light transmittance in the first information layer after the initialization was 44.2%.

EXAMPLE 12

A dual layer phase change optical recording medium was made in the same way as in Example 1 except that the material of the optical transmission layer in the first information layer was changed to $In_2O_3$ (8.8 mol %)-ZnO (41.7 mol %)-$SnO_2$ (35.2 mol %)-$SiO_2$ (14.3 mol %) and its thickness was changed to 65 nm in Example 1. The light transmittance in the first information layer after the initialization was 44.5%.

EXAMPLE 13

A dual layer phase change optical recording medium was made in the same way as in Example 1 except that the material of the optical transmission layer in the first information layer was changed to $In_2O_3$ (12 mol %)-ZnO (80 mol %)-$SnO_2$ (8 mol %) and its thickness was changed to 60 nm in Example 1. The light transmittance in the first information layer after the initialization was 44.7%.

EXAMPLE 14

A dual layer phase change optical recording medium was made in the same way as in Example 1 except that the material of the optical transmission layer in the first information layer was changed to $In_2O_3$ (12 mol %)-ZnO (80 mol %)-$SnO_2$ (8 mol %) and its thickness was changed to 65 nm in Example 1. The light transmittance in the first information layer after the initialization was 44.4%.

Comparative Example 1

A dual layer phase change optical recording medium was made in the same way as in Example 1 except that the material of the optical transmission layer in the first information layer was changed to $Ta_2O_5$ in Example 1. The light transmittance in the first information layer after the initialization was 39.5%.

Comparative Example 2

A dual layer phase change optical recording medium was made in the same way as in Example 1 except that the material of the optical transmission layer in the first information layer was changed to $Ta_2O_5$ and its thickness was changed to 50 nm in Example 1. The light transmittance in the first information layer after the initialization was 37.5%.

Comparative Example 3

A dual layer phase change optical recording medium was made in the same way as in Example 1 except that the material of the optical transmission layer in the first information layer was changed to $Al_2O_3$ in Example 1. The light transmittance in the first information layer after the initialization was 39.2%.

Comparative Example 4

A dual layer phase change optical recording medium was made in the same way as in Example 1 except that the material of the optical transmission layer in the first information layer was changed to $Al_2O_3$ and its thickness was changed to 50 nm in Example 1. The light transmittance in the first information layer after the initialization was 37.2%.

EXAMPLE 15

A dual layer phase change optical recording medium was made in the same way as in Example 1 except that the thickness of the optical transmission layer in the first information layer was changed to 40 nm in Example 1. The light transmittance in the first information layer after the initialization was 40.5%.

EXAMPLE 16

A dual layer phase change optical recording medium was made in the same way as in Example 1 except that the thickness of the optical transmission layer in the first information layer was changed to 260 nm in Example 1. The light transmittance in the first information layer after the initialization was 40.1%.

Comparative Example 5

A dual layer phase change optical recording medium was made in the same way as in Example 1 except that the material of the optical transmission layer in the first information layer was changed to $In_2O_3$ (90 mol %)-ZnO (10 mol %) and its thickness was changed to 60 nm in Example 1. The light transmittance in the first information layer after the initialization was 39.1%.

EXAMPLE 17

A dual layer phase change optical recording medium was made in the same way as in Example 1 except that the material of the optical transmission layer in the first information layer was changed to $In_2O_3$ (8.8 mol %)-ZnO (41.7 mol %)-$SnO_2$ (35.2 mol %)-$SiO_2$ (14.3 mol %) and its thickness was changed to 45 nm in Example 1. The light transmittance in the first information layer after the initialization was 43%.

EXAMPLE 18

A dual layer phase change optical recording medium was made in the same way as in Example 1 except that the material of the optical transmission layer in the first information layer was changed to $In_2O_3$ (8.8 mol %)-ZnO (41.7 mol %)-SnO2 (35.2 mol %)-$SiO_2$ (14.3 mol %) and its thickness was changed to 50 nm in Example 1. The light transmittance in the first information layer after the initialization was 43.3%.

EXAMPLE 19

A dual layer phase change optical recording medium was made in the same way as in Example 1 except that the material of the optical transmission layer in the first information layer was changed to $In_2O_3$ (12 mol %)-ZnO (80 mol %)-$SnO_2$ (8 mol %) and its thickness was changed to 45 nm in Example 1. The light transmittance in the first information layer after the initialization was 43.5%.

EXAMPLE 20

A dual layer phase change optical recording medium was made in the same way as in Example 1 except that the material of the optical transmission layer in the first information layer was changed to $In_2O_3$ (12 mol %)-ZnO (80 mol %)-$SnO_2$ (8 mol %) and its thickness was changed to 50 nm in Example 1. The light transmittance in the first information layer after the initialization was 43.8%.

EXAMPLE 21

A dual layer phase change optical recording medium was made in the same way as in Example 1 except that the material of the optical transmission layer in the first information layer was changed to $In_2O_3$ (16 mol %)-ZnO (14 mol %)-$SnO_2$ (70 mol %) and its thickness was changed to 50 nm in Example 1. The light transmittance in the first information layer after the initialization was 42.7%.

On the contrary, as shown in Examples 2 and 3, when the Sn oxide was the major component in the first upper protection layer and the optical transmission layer, the modulation degree could be enhanced.

Also as shown in Example 6, when the Sn oxide was the major component also in the first lower protection layer, the equivalent modulation degree could be assured at low power and the recording sensitivity was enhanced. Furthermore, as shown in Example 7, even when the first lower protection layer was the dual layer, the effects could be kept.

As shown in Table 2, according to the present invention, it is possible to lower the optimal recording power Ppo [mW] in the first information layer and lower the recording power in the second information layer because the light transmittance could be enhanced. Thus, the consumption of electric power for laser output in the recording apparatus can be reduced.

TABLE 2

|  | First information layer optical (%) | Ppo[mW] | Modulation degree@Ppo | Itop (%) | Itop x M (%) | Determination |
|---|---|---|---|---|---|---|
| Example 1 | 43.2 | 36 | 0.61 | 6.6 | 4.03 | A |
| Example 2 | 43.8 | 36 | 0.638 | 6.4 | 4.08 | A |
| Example 3 | 41.8 | 36 | 0.651 | 6.2 | 4.04 | A |
| Example 4 | 41.7 | 37 | 0.645 | 6.5 | 4.19 | A |
| Example 5 | 40.7 | 37 | 0.625 | 6.6 | 4.13 | A |
| Example 6 | 43.1 | 35 | 0.654 | 7.2 | 4.71 | A |
| Example 7 | 42.8 | 35 | 0.664 | 6.4 | 4.25 | A |
| Example 8 | 43.1 | 35 | 0.607 | 6.6 | 4.01 | A |
| Example 9 | 42.9 | 35 | 0.593 | 7.1 | 4.21 | A |
| Example 10 | 42.7 | 35 | 0.58 | 7.4 | 4.29 | A |
| Example 11 | 44.2 | 33 | 0.648 | 6.3 | 4.08 | A |
| Example 12 | 44.5 | 33 | 0.63 | 6.5 | 4.1 | A |
| Example 13 | 44.7 | 36 | 0.628 | 6.4 | 4.02 | A |
| Example 14 | 44.4 | 36 | 0.608 | 6.7 | 4.07 | A |
| Comparative Example 1 | 39.5 | 39 | 0.45 | 6.4 | 2.88 | C |
| Comparative Example 2 | 37.5 | 39 | 0.48 | 6.1 | 2.93 | C |
| Comparative Example 3 | 39.2 | 39 | 0.44 | 6.3 | 2.77 | C |
| Comparative Example 4 | 37.2 | 39 | 0.47 | 6 | 2.82 | C |
| Example 15 | 40.5 | 36 | 0.67 | 5.9 | 3.95 | B |
| Example 16 | 40.1 | 36 | 0.62 | 6.4 | 3.97 | B |
| Comparative Example 5 | 39.1 | 38 | 0.62 | 7.02 | 4.35 | C |
| Example 17 | 43 | 32 | 0.648 | 5.43 | 3.52 | B |
| Example 18 | 43.3 | 32 | 0.63 | 6 | 3.78 | B |
| Example 19 | 43.5 | 34 | 0.602 | 6 | 3.61 | B |
| Example 20 | 43.8 | 34 | 0.608 | 6.2 | 3.77 | B |
| Example 21 | 42.7 | 34 | 0.612 | 6 | 3.67 | B |

Figure 6:
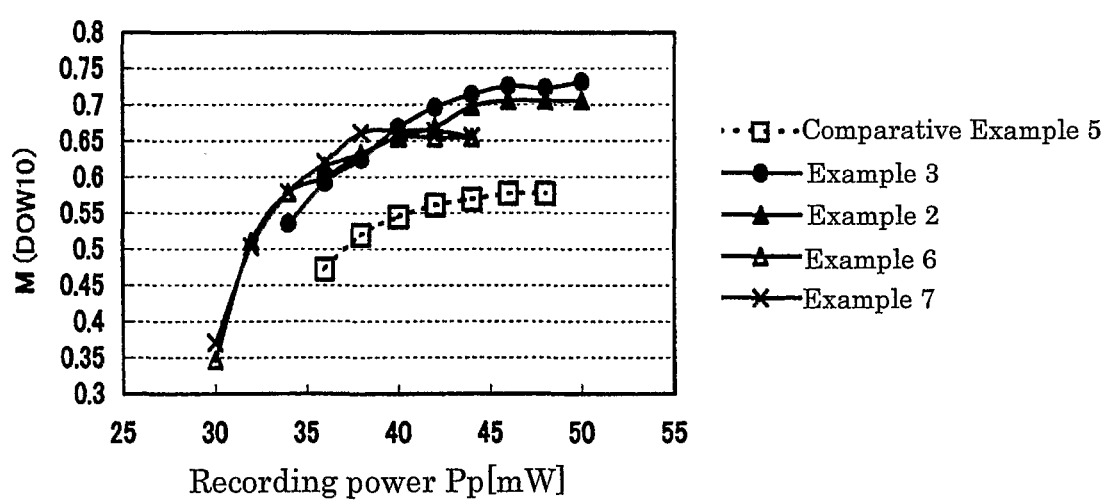
FIG. 6 is a view showing recording power (Pp) dependency of a modulation degree M (of DOW 10).
Figure 7:
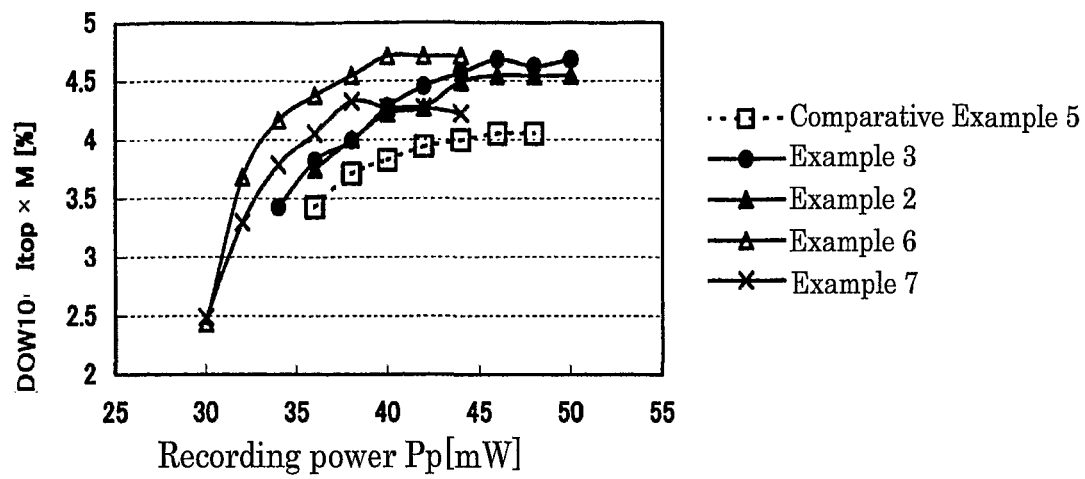
FIG. 7 is a view showing recording power (Pp) dependency of "Itop×M" of DOW 10.

For the above Examples 2, 3, 6 and 7 and Comparative Example 5, the modulation degree M (DOW 10) and "Itop× M (%)" after recording repeatedly 10 times (DOW 10) when the recording power (peak power Pp) was changed are shown in FIGS. 6 and 7.

When $In_2O_3$ (90 mol %)-ZnO (10 mol %) was used without using Sn oxide for the optical transmission layer in the first information layer as in Comparative Example 5, a low modulation degree curve was obtained as shown in FIG. 6 when recorded in the first information layer at a recording speed of 9.2 m/s. As the recording power was increased, the modulation degree was saturated at less than 0.6. As shown in FIG. 7, the recording performance "Itop×M" was increased to about 4%, but the transmittance became poor.

EXAMPLES 22 TO 35

For the dual layer phase change optical recording medium in Example 1, respective Examples, the storage property was evaluated.

The recording line speed was 9.2 m/s when recorded in the first recording layer. The recording was evaluated by performing the random recording repeatedly 10 times (DOW 10) in three tracks and replaying the middle track among them. The 1T cycle recording strategy was used for the recording method. The property was evaluated by jitters when the marks of 3T to 11T and 14T and the space were randomly recorded. The jitter is one represented by standardizing a time lag between the border and the clock with a window width when the reflectance ratio levels of the mark and the space are binarized at slice level.

For the determination criteria of the storage property, after stored under the environment of temperature at 80° C. and 85% RH for 100 hours, when the change amount (increase amount) of DOW 10 jitter was 1% or less, this case was determined as acceptance, and the case of exceeding 1% was determined as rejection. The evaluation results are collectively shown in Table 3.

EXAMPLE 22

A dual layer phase change optical recording medium was made in the same way as in Example 1 except in that an element added in the first reflection layer in the first information layer was changed to Ta (2.0% by mass) in Example 1.

EXAMPLE 23

A dual layer phase change optical recording medium was made in the same way as in Example 1 except that the element added in the first reflection layer in the first information layer was changed to Nb (1.0% by mass) in Example 1.

EXAMPLE 24

A dual layer phase change optical recording medium was made in the same way as in Example 1 except that the element added in the first reflection layer in the first information layer was changed to Cr (0.6% by mass) in Example 1.

EXAMPLE 25

A dual layer phase change optical recording medium was made in the same way as in Example 1 except that the element added in the first reflection layer in the first information layer was changed to Zr (1.0% by mass) in Example 1.

EXAMPLE 26

A dual layer phase change optical recording medium was made in the same way as in Example 1 except that the element added in the first reflection layer in the first information layer was changed to Ni (0.7% by mass) in Example 1.

EXAMPLE 27

A dual layer phase change optical recording medium was made in the same way as in Example 1 except that the element added in the first reflection layer in the first information layer was changed to Ge (0.8% by mass) in Example 1.

EXAMPLE 28

A dual layer phase change optical recording medium was made in the same way as in Example 1 except that the element added in the first reflection layer in the first information layer was changed to Zr (0.3% by mass) in Example 1.

EXAMPLE 29

A dual layer phase change optical recording medium was made in the same way as in Example 1 except that the element added in the first reflection layer in the first information layer was changed to Ge (0.2% by mass) in Example 1.

EXAMPLE 30

A dual layer phase change optical recording medium was made in the same way as in Example 1 except that the element added in the first reflection layer in the first information layer was changed to Au (2.2% by mass) in Example 1.

EXAMPLE 31

A dual layer phase change optical recording medium was made in the same way as in Example 1 except that the element added in the first reflection layer in the first information layer was changed to Mo (4.0% by mass) in Example 1.

EXAMPLE 32

A dual layer phase change optical recording medium was made in the same way as in Example 1 except that the element added in the first reflection layer in the first information layer was changed to Mo (5.0% by mass) in Example 1.

EXAMPLE 33

A dual layer phase change optical recording medium was made in the same way as in Example 1 except in that no element was added in the first reflection layer in the first information layer in Example 1.

EXAMPLE 34

A dual layer phase change optical recording medium was made in the same way as in Example 1 except that the element added in the first reflection layer in the first information layer was changed to Mo (5.5% by mass) in Example 1.

EXAMPLE 35

A dual layer phase change optical recording medium was made in the same way as in Example 1 except that the first reflection layer in the first information layer was changed to Ag in Example 1. As shown in Example 35, the reflection layer may be Ag, but the reflection layer whose major component is Cu is more effective for the storage property.

TABLE 3

|  | Added metal | % by mass | Change amount of DOW 10 jitter (%) |
|---|---|---|---|
| Example 1 | Mo | 1.1 | 0.15 |
| Example 22 | Ta | 2.0 | 0.2 |
| Example 23 | Nb | 1.0 | 0.6 |
| Example 24 | Cr | 0.6 | 0.6 |
| Example 25 | Zr | 1.0 | 0.4 |
| Example 26 | Ni | 0.7 | 0.7 |
| Example 27 | Ge | 0.8 | 0.75 |
| Example 28 | Zr | 0.3 | 0.9 |
| Example 29 | Ge | 0.2 | 0.9 |
| Example 30 | Au | 2.2 | 0.85 |
| Example 31 | Mo | 4.0 | 0.5 |
| Example 32 | Mo | 5.0 | 0.7 |
| Example 33 | None | 0.0 | 0.9 |
| Example 34 | Mo | 5.5 | 1.15 |
| Example 35 | pure Ag | none | 0.96 |

EXAMPLE 36

A dual layer phase change optical recording medium was made in the same way as in Example 2 except that the material of the first upper protection layer was changed to $In_2O_3$ (7.5 mol %)-ZnO (22.5 mol %)-SnO$_2$ (60 mol %)-SiO$_2$ (10 mol %) in Example 2, and evaluated.

As a result of recording repeatedly 10 times in the first recording layer in the first information layer, the jitter was 6.9%, and the change amount of the jitter after stored under the environment of temperature at 80° C. and 85% RH for 100 hours was 0.1%.

EXAMPLE 37

A dual layer phase change optical recording medium was made in the same way as in Example 36 except that the material of the first upper protection layer was changed to In$_2$O$_3$ (7.5 mol %)-ZnO (22.5 mol %)-SnO$_2$ (70 mol %) in Example 36, and evaluated.

As a result of recording repeatedly 10 times in the first recording layer in the first information layer, the jitter was 7.5%, and the change amount of the jitter after stored under the environment of temperature at 80° C. and 85% RH for 100 hours was 0.1%.

EXAMPLE 38

A dual layer phase change optical recording medium was made in the same way as in Example 36 except that the material of the first upper protection layer was changed to SnO$_2$ (80 mol %)-Ta$_2$O$_5$ (20 mol %) in Example 36, and evaluated.

As a result of recording repeatedly 10 times in the first recording layer in the first information layer, the jitter was 9%, and the change amount of the jitter after stored under the environment of temperature at 80° C. and 85% RH for 100 hours was 0.3%.

EXAMPLE 39

A dual layer phase change optical recording medium was made in the same way as in Example 36 except that the material of the first upper protection layer was changed to SnO$_2$ (90 mol %)-Ta$_2$O$_5$ (10 mol %) in Example 36, and evaluated.

As a result of recording repeatedly 10 times in the first recording layer in the first information layer, the jitter was 10%, and the change amount of the jitter after stored under the environment of temperature at 80° C. and 85% RH for 100 hours was 0.8%.

EXAMPLE 40

A dual layer phase change optical recording medium was made in the same way as in Example 36 except that the material of the first upper protection layer was changed to SnO$_2$ (95 mol %)-Ta$_2$O$_5$ (5 mol %) in Example 36, and evaluated.

As a result of recording repeatedly 10 times in the first recording layer in the first information layer, the jitter was 10%, and the change amount of the jitter after stored under the environment of temperature at 80° C. and 85% RH for 100 hours was 1.1%.

EXAMPLE 41

A dual layer phase change optical recording medium was made in the same way as in Example 36 except that the material of the first upper protection layer was changed to In$_2$O$_3$ (9.2 mol %)-ZnO (27.5 mol %)-SnO$_2$ (53.3 mol %)-Ta$_2$O$_5$ (10 mol %) in Example 36, and evaluated.

As a result of recording repeatedly 10 times in the first recording layer in the first information layer, the jitter was 7.5%, and the change amount of the jitter after stored under the environment of temperature at 80° C. and 85% RH for 100 hours was 0.2%.

EXAMPLE 42

A dual layer phase change optical recording medium was made in the same way as in Example 36 except that the material of the first upper protection layer was changed to In$_2$O$_3$ (7.5 mol %)-ZnO (22.5 mol %)-SnO$_2$ (50 mol %)-Ta$_2$O$_5$ (20 mol %) in Example 36, and evaluated.

As a result of recording repeatedly 10 times in the first recording layer in the first information layer, the jitter was 10%, and the change amount of the jitter after stored under the environment of temperature at 80° C. and 85% RH for 100 hours was 0.1%.

EXAMPLE 43

A dual layer phase change optical recording medium was made in the same way as in Example 36 except that the material of the first upper protection layer was changed to In$_2$O$_3$ (7.5 mol %)-ZnO (22.5 mol %)-SnO$_2$ (45 mol %)-Ta$_2$O$_5$ (25 mol %) in Example 36, and evaluated.

As a result of recording repeatedly 10 times in the first recording layer in the first information layer, the jitter was 18.3%, and the change amount of the jitter after stored under the environment of temperature at 80° C. and 85% RH for 100 hours was 0.3%.

As the jitter of the repeated recording in Example 43 considerably worsened compared with Example 42, when the content of SnO$_2$ is less than 50%, the excellent storage stability can be assured, but it becomes uneasy to perform the repeated recording at about 10 m/s. This seems to be caused because the transfer line speed is delayed and it becomes difficult to completely delete the amorphous mark upon repeated recording (see FIG. 8).

<Evaluation>

For Examples 36 to 43, the change amount of the DOW 10 jitter when stored under the environment of the temperature at 80° C. and 85% RH for 100 hours was evaluated in the same way as in Example 22. The results are collectively shown in FIG. 11. For Examples 36, 41, 42 and 43, the results of measuring the transfer line speed and the DOW 10 jitter are collectively shown in FIG. 8.

EXAMPLES 44 TO 46 AND COMPARATIVE EXAMPLES 6 TO 13

A dual layer phase change optical recording medium was made in the same way as in Example 2 except that the thickness of the first upper protection layer was changed to 0 nm (Comparative Examples 6), 2 nm (Example 44), 10 nm (Example 45), 15 nm (Example 46), 20 nm (Comparative Examples 7), 25 nm (Comparative Examples 8) or 30 nm (Comparative Examples 9). A dual layer phase change optical recording medium was also made in the same way as in Example 2 except that the material of the first upper protection layer was changed to ZnO (80 mol %)-SiO$_2$ (20 mol %) and its thickness was changed to 5 nm (Comparative Examples 10), 10 nm (Comparative Examples 11), 15 nm (Comparative Examples 12) and 20 nm (Comparative Examples 13).

For these optical recording medium, the change amount of the DOW 10 jitter was evaluated in the same way as in Example 22. The results are collectively shown together with Example 2 (thickness 5 nm) in FIG. 10.

As is shown in the figure, the medium in which the change amount of the DOW 10 jitter is very small is obtained when the Sn oxide is contained and the thickness is 15 nm or less whereas in Comparative Examples using ZnO—$SiO_2$, the change amount of the DOW 10 jitter is about 3% or more in any cases.

Figure 17:
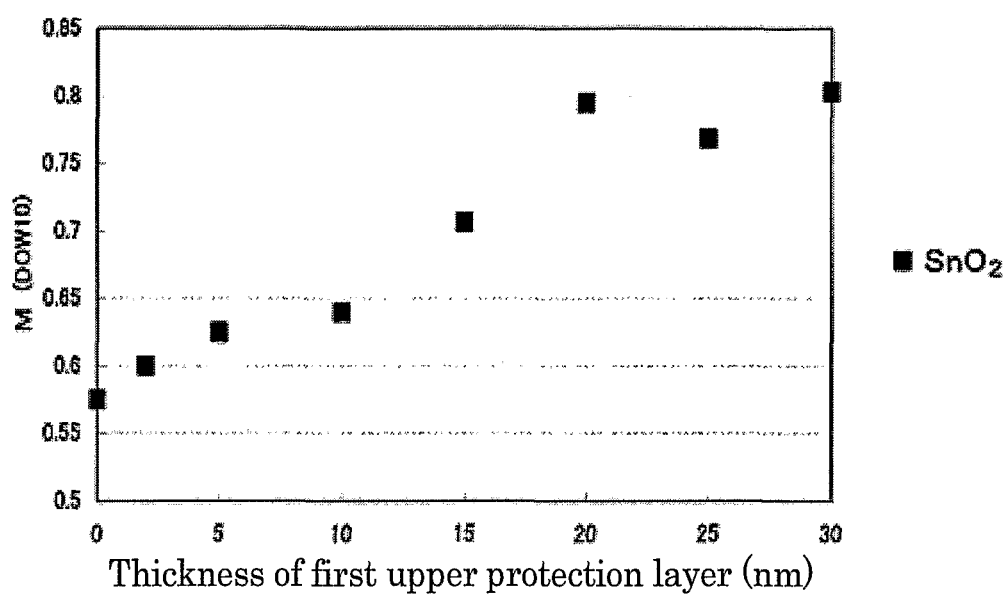
FIG. 17 is a view showing dependency of the modulation degree M (DOW 10) when stored under an environment at 80° C. and 85% RH for 100 hours on a thickness of the first upper protection layer.

Meanwhile, the results obtained by measuring the modulation degree M (DOW 10) for the optical recording medium using $SnO_2$ and the optical recording medium in Comparative Example 6 are shown in FIG. 17. As is shown in the figure, the modulation degree M of 60% or more can not be assured in Comparative Example 6.

Figure 10:
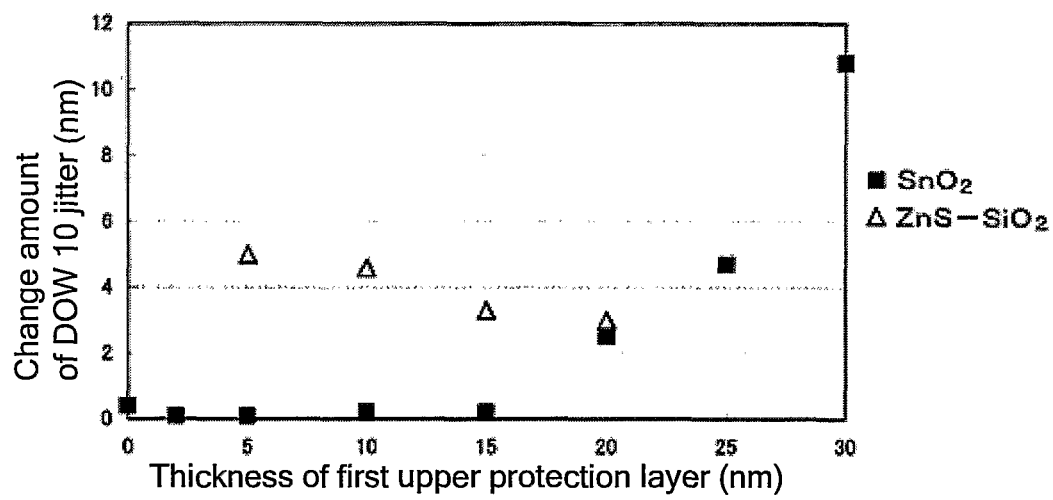
FIG. 10 is a view showing dependency of a DOW 10 jitter change amount when stored under an environment at 80° C. and 85% RH for 100 hours on a thickness of the first upper protection layer.

Therefore, combining the results in FIGS. 10 and 17, it is found that it is necessary that the thickness of the first upper protection layer is in the range of 2 nm to 15 nm.

EXAMPLES 47 TO 51 AND COMPARATIVE EXAMPLES 14 TO 15

The evaluation was performed using the dual layer optical recording medium made in Example 36. The jitters after recording repeatedly 10 times (DOW 10), after recording repeatedly 100 times (DOW 100), and after recording repeatedly 500 times (DOW 500) at a recording line speed of 9.2 m/s were measured with changing Tr value. In the evaluation criterion, the case of showing the jitter of 11% or less was determined as acceptance.

The results are shown in Table 4. When Tr is set up to be shorter than (n−1.5)T, the jitter worsens because the shorter mark than the desired amorphous mark length is formed. When Tr is set up to be longer than (n−0.5)T, the longer mark than the desired amorphous mark length is formed, and deletion power is set up to be high to adjust it. The recording property in recording repeatedly 500 times worsens due to contribution of heat effect.

TABLE 4

| 9.2 m/s Recording | Tr [T] | DOW 10 | DOW 100 | DOW 500 |
|---|---|---|---|---|
| Comparative Example 14 | n-0.3 | 8.5 | 10.5 | 12.2 |
| Example 47 | n-0.5 | 8.3 | 9.3 | 10.7 |
| Example 48 | n-0.7 | 7.9 | 9.1 | 10.1 |
| Example 49 | n-1 | 7 | 8.1 | 9.6 |
| Example 50 | n-1.3 | 7.4 | 8.5 | 9.9 |
| Example 51 | n-1.5 | 8.5 | 8.9 | 10.4 |
| Comparative Example 15 | n-1.7 | 9.2 | 10.8 | 12.3 |

The invention claimed is:

1. A multilayer optical recording medium comprising:
at least multiple information layers;
wherein the multiple information layers each comprise at least a phase change recording layer capable of recording information by laser irradiation, and a reflection layer,
wherein each information layer other than an innermost information layer as seen from a side of the laser irradiation comprises a lower protection layer, the phase change recording layer, an upper protection layer, the reflection layer and an optical transmission layer,
the upper protection layer in each information layer other than the innermost information layer as seen from the side of the laser irradiation is composed of a material containing an oxide of Sn,
the optical transmission layer in each information layer other than the innermost information layer as seen from the side of the laser irradiation is composed of a material containing $SnO_2$ as the major component and $In_2O_3$, and
a thickness of the upper protection layer in each information layer other than the innermost information layer as seen from the side of the laser irradiation is 2 nm to 15 nm, and
wherein the reflection layer in each information layer other than the innermost information layer as seen from the side of the laser irradiation contains Cu as the major component and further contains at least one metal element selected from the group consisting of Mo, Nb and Ge at 5% by mass or less.

2. The multilayer optical recording medium according to claim 1, wherein the upper protection layer in each information layer other than the innermost information layer as seen from the side of the laser irradiation contains 50 mol % to 90 mol % of the oxide of Sn.

3. The multilayer optical recording medium according to claim 1, wherein the thickness of the optical transmission layer in each information layer other than the innermost information layer as seen from the side of the laser irradiation is 51 nm to 250 nm.

4. The multilayer optical recording medium according to claim 1, wherein the lower protection layer in each information layer other than the innermost information layer as seen from the side of the laser irradiation is composed of a material containing an oxide of Sn.

5. The multilayer optical recording medium according to claim 1, wherein the lower protection layer in each information layer other than the innermost information layer as seen from the side of the laser irradiation is composed of a dual layer laminate structure and at least one layer of said dual layer laminate structure is composed of a material containing an oxide of Sn.

6. The multilayer optical recording medium according to claim 1, wherein the multilayer optical recording medium comprises a first substrate, a first information layer, an intermediate layer, a second information layer and a second substrate in this order as seen from the side of the laser irradiation,
the first information layer comprises a first lower protection layer, a first phase change recording layer, a first upper protection layer, a first reflection layer and an optical transmission layer in this order as seen from the side of the laser irradiation, and
the second information layer comprises a second lower protection layer, a second phase change recording layer, a second upper protection layer and a second reflection layer in this order as seen from the side of the laser irradiation.

* * * * *